(12) United States Patent
Wang et al.

(10) Patent No.: US 11,343,818 B2
(45) Date of Patent: May 24, 2022

(54) ENHANCED POSITIONING REFERENCE SIGNAL PATTERNS FOR POSITIONING

(71) Applicant: Telefonaktiebolaget LM Ericsson (publ), Stockholm (SE)

(72) Inventors: Meng Wang, Sundyberg (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/565,562

(22) PCT Filed: Apr. 11, 2016

(86) PCT No.: PCT/SE2016/050304
§ 371 (c)(1),
(2) Date: Oct. 10, 2017

(87) PCT Pub. No.: WO2016/163943
PCT Pub. Date: Oct. 13, 2016

(65) Prior Publication Data
US 2018/0124787 A1    May 3, 2018

Related U.S. Application Data

(60) Provisional application No. 62/145,784, filed on Apr. 10, 2015.

(51) Int. Cl.
*H04W 72/04*    (2009.01)
*G01S 5/02*    (2010.01)
(Continued)

(52) U.S. Cl.
CPC ....... *H04W 72/0453* (2013.01); *G01S 5/0226* (2013.01); *G01S 5/0236* (2013.01);
(Continued)

(58) Field of Classification Search
CPC ..... H04L 5/0005; H04L 5/0048; H04L 5/005; H04L 27/2607; H04L 27/2613; H04W 60/00
See application file for complete search history.

(56) References Cited

U.S. PATENT DOCUMENTS

2010/0317343 A1* 12/2010 Krishnamurthy ......... G01S 1/30
455/435.1
2011/0117925 A1* 5/2011 Sampath ............... H04W 48/20
455/456.1

(Continued)

OTHER PUBLICATIONS

Huawei et al., "Way forward on possible enhancements for OTDOA", 3GPP TSG RAN WG1 Meeting #80, Feb. 9-13, 2015, pp. 1-2, Athens, Greece, R1-15XXXX.
(Continued)

*Primary Examiner* — Christopher M Crutchfield
*Assistant Examiner* — Tito Q Pham
(74) *Attorney, Agent, or Firm* — Coats + Bennett, PLLC

(57) ABSTRACT

Embodiments herein relate to method for transmitting positioning reference signals (PRSs) in a cell served by a base station. The base station maps PRSs onto different groups of time-frequency resources according to different respective PRS patterns, wherein each of the different groups spans one or more consecutive subframes in time. The base station transmits the PRSs in the cell in accordance with said mapping.

18 Claims, 23 Drawing Sheets

(51) Int. Cl.
    *H04W 64/00*     (2009.01)
    *G01S 5/00*     (2006.01)
    *G01S 5/10*     (2006.01)
    *H04L 5/00*     (2006.01)
    *H04L 27/26*     (2006.01)

(52) U.S. Cl.
    CPC .............. *G01S 5/10* (2013.01); *H04L 5/0005* (2013.01); *H04L 5/005* (2013.01); *H04L 27/2607* (2013.01); *H04L 27/2613* (2013.01); *H04W 64/00* (2013.01); *G01S 5/0036* (2013.01)

(56) References Cited

U.S. PATENT DOCUMENTS

| | | | | |
|---|---|---|---|---|
| 2013/0308567 | A1* | 11/2013 | Chen | H04L 5/005 370/329 |
| 2013/0336224 | A1* | 12/2013 | Davydov | H04W 4/70 370/328 |
| 2015/0319731 | A1* | 11/2015 | Cui | H04W 64/00 455/456.1 |
| 2016/0119095 | A1* | 4/2016 | Lee | H04W 16/00 370/329 |
| 2016/0195601 | A1* | 7/2016 | Siomina | G01S 5/0205 455/456.1 |
| 2017/0289953 | A1* | 10/2017 | Chae | G01S 1/02 |

OTHER PUBLICATIONS

Ericsson, "PRS enhancements for indoor positioning", 3GPP TSG RAN WG1 Meeting #80bis, Apr. 20-24, 2015, pp. 1-5, Belgrade, Serbia, R1-151945.

Ericsson et al., "Time varying PRS pattern", 3GPP TSG RAN WG1 Meeting #58, Aug. 24-28, 2009, pp. 1-3, Shenzhen, P.R. China, R1-093481.

3rd Generation Partnership Project, "Technical Specification Group Radio Access Network; Evolved Universal Terrestrial Radio Access (E-UTRA); Physical channels and modulation (Release 12)", 3GPP TS 36.211 V12.5.0, Mar. 2015, pp. 1-136.

3rd Generation Partnership Project, "Technical Specification Group Radio Access Network; Evolved Universal Terrestrial Radio Access (E-UTRA); LTE Positioning Protocol A (LPPa) (Release 12)", 3GPP TS 36.455 V12.2.0, Mar. 2015, pp. 1-62.

Qualcomm, "Discussion on E911 Indoor Location Accuracy", Nov. 18, 2013, pp. 1-11.

\* cited by examiner

Map PRSs onto different groups of time-frequency resources according to different respective PRS patterns, wherein each of the different groups spans one or more consecutive subframes in time, the different groups of time-frequency resources being separated in time so as to constitute two individual positioning occasions or being separated in frequency so as to constitute a single individual positioning occasion.

Transmit the PRSs in a cell in accordance with said mapping.

Fig. 3

Receive from a base station at a UE PRSs that are mapped onto different groups of time-frequency resources according to different respective PRS patterns, wherein each of the different groups spans one or more consecutive subframes in time, the different groups of time-frequency resources being separated in time so as to constitute two individual positioning occasions or being separated in frequency so as to constitute a single individual positioning occasion Measure the PRSs for determining the location of the UE

Fig. 4

Generate configuration information that configures mapping of PRSs onto different groups of time-frequency resources according to different respective PRS patterns, wherein each of the different groups spans one or more consecutive subframes in time, the different groups of time-frequency resources being separated in time so as to constitute two individual positioning occasions or being separated in frequency so as to constitute a single individual positioning occasions.

Transmit the configuration information to a base station for mapping of the PRSs in accordance with the configuration information.

Fig. 5

Receive PRSs from a base station at a UE in the cell, wherein individual ones of the PRSs are mapped onto time-frequency resources within each of multiple consecutive subframes of a positioning occasion according to different PRS patterns for at least two of those subframes, wherein the different PRS patterns are frequency shifted relative to one another.

Measure the PRSs for determining the location of the UE.

Fig. 7

ENHANCED POSITIONING REFERENCE SIGNAL PATTERNS FOR POSITIONING

TECHNICAL FIELD

Embodiments herein relate to a base station, a wireless device, a positioning network node and methods performed therein. In particular, embodiments herein relate to Positioning reference signals for positioning of wireless devices in a wireless communication network.

BACKGROUND

Location-based services and emergency call positioning drive the development of positioning in wireless networks. Positioning support in Third Generation Partnership Project Long Term Evolution (3GPP LTE) was introduced in Release 9. This enables operators to retrieve position information for location-based services and to meet regulatory emergency call positioning requirements.

Global positioning system (GPS)-enabled terminals can meet the requirement for positioning, but GPS cannot provide the required availability in urban and indoor environments due to the satellite signals being blocked in urban and indoor environments. Therefore, other techniques are needed in such environments. Observed time difference of arrival (OTDOA) has been introduced in 3GPP release 9 as a downlink (DL) positioning method. OTDOA in LTE is based on the user equipment (UE) measuring the time of arrival (TOA) of signals received from multiple base stations (e.g., eNBs). The TOAs from neighboring cells are subtracted from the TOA of a reference eNB, defined as reference signal time difference (RSTD) measurement. Every such RSTD determines a hyperbola and the intersection of these hyperbolas can be considered as the UE position.

In principle, it is possible to measure RSTD on any downlink signals e.g. on Cell Specific Reference Signals (CRS). However, in OTDOA, the UE detects multiple neighbor-cell signals, and these signals suffer from poor hearability. Hence, positioning reference signals (PRSs) have been introduced to improve OTDOA positioning performance. FIG. 1(a) and FIG. 1(b) show the arrangement of the PRSs in one resource block (RB) pair of a subframe for normal Cyclic Prefix (CP) and extended CP, respectively. Such arrangements are examples of PRS patterns. In such a PRS subframe, in order to reduce the interference with neighbor cells, no Physical Downlink Shared Channel (PDSCH) data is carried. Physical Downlink Control Channel (PDCCH) and CRSs are retained in the subframe, while PRSs are distributed in a "diagonal" way in between CRSs. Similarly to what is applied for CRS, cell-specific frequency shift, where the number of frequency shift is given by Physical Cell Identity (PCI) modulo 6, is applied to a PRS pattern, which helps avoid time-frequency PRS collision in up to six neighbor cells. Mathematically, according to 3GPP TS 36.211, Evolved Universal Terrestrial Radio Access (E-UTRA); Physical channels and modulation, v12.0.0, the PRS shall be mapped to the resource element (k,l), i.e. the time-frequency PRS pattern can be written as 1. Normal Cyclic Prefix:

$$k = 6(m + N_{RB}^{DL} - N_{RB}^{PRS}) + (6 - l + v_{shift})\bmod 6$$

$$l = \begin{cases} 3, 5, 6 & \text{if } n_s\bmod 2 = 0 \\ 1, 2, 3, 5, & \text{if } n_s\bmod 2 = 1 \text{ and } (1 \text{ or } 2 PhysicalBroadcast \\ 6 & Channel(PBCH)\text{antenna ports}) \\ 2, 3, 5, 6 & \text{if } n_s\bmod 2 = 1 \text{ and } (4 \text{ } PBCH \text{antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

where $n_s$ is the slot number and $N_{RB}^{PRS}$, $N_{RB}^{DL}$, $N_{RB}^{max,DL}$ denote the number of resource blocks (RBs) for PRS, PDSCH and DL maximum bandwidth, respectively.

2. Extended Cyclic Prefix:

$$k = 6(m + N_{RB}^{DL} - N_{RB}^{PRS}) + (5 - l + v_{shift})\bmod 6$$

$$l = \begin{cases} 4, 5 & \text{if } n_s\bmod 2 = 0 \\ 1, 2, 4, 5 & \text{if } n_s\bmod 2 = 1 \text{ and } (1 \text{ or } 2 \text{ } PBCH \text{ antenna ports}) \\ 2, 4, 5 & \text{if } n_s\bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

The bandwidth for PRS, $N_{RB}^{PRS}$ is configured by higher layers and the cell-specific frequency shift, $v_{shift}$, is given by $v_{shift} = N_{ID}^{cell} \bmod 6$.

In a LTE system, consecutive PRS subframes, a.k.a. positioning occasions, are transmitted periodically in the downlink. In LTE legacy systems, one positioning occasion may contain up to six consecutive PRS subframes, see FIG. 2(a).

The period of one positioning occasion can be configured to every $T_{PRS}$=160, 320, 640 and 1280 milliseconds. It is noted that, in Time Division Duplex (TDD) mode, uplink subframe and other special frames cannot contain PRSs. Another parameter to characterize the PRS transmission schedule is a cell specific subframe offset, which defines the starting subframe of PRS transmission relative to System Frame Number (SFN)=0. As shown in Table 1, the PRS periodicity $T_{PRS}$ and subframe offset $\Delta_{PRS}$ are derived from the PRS Configuration Index $I_{PRS}$.

TABLE 1

| Positioning reference signal subframe configuration | | |
|---|---|---|
| PRS configuration Index $I_{PRS}$ | PRS periodicity $T_{PRS}$ (subframes) | PRS subframe offset $\Delta_{PRS}$ (subframes) |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | | Reserved |

PRSs are transmitted from one antenna port (R6) according to a pre-defined pattern. To reduce interference from transmission of PRSs from neighbor cells, the positioning occasions may be misaligned on purpose, e.g., due to network deployment issues, for example, in a network with a mix of macro cells and low-power nodes such as pico or femto nodes, there may be an interference issue when an interferer is much stronger than the serving cell. Such a cell-specific frequency shift is a function of PCI and can be applied to the specified PRS patterns to generate orthogonal patterns. In some cases, in particular dense deployment, only cell-specific frequency shift may not be sufficient to avoid interference from neighbor cells. Therefore, PRS muting has been introduced to further reduce inter-cell interference by muting PRS transmission in other cells based on a periodical "muting pattern".

Network elements in an LTE positioning architecture include the Location Services (LCS) Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client.

Position calculation can be conducted, for example, by a UE or by a positioning server, such as an Evolved Serving Mobile Location Center (E-SMLC) or Secure User Plan Location (SUPL) Location Platform (SLP) in LTE. The former approach corresponds to the UE-based positioning mode, whilst the latter corresponds to the UE-assisted positioning mode.

The positioning architecture, as shown in FIG. 2(b), in LTE operates via two positioning protocols: LTE Positioning Protocol (LPP) and LPP Annex (LPPa). LPP is used for communication between a LCS Server, such as a network node e.g. an Enhanced-Serving Mobile Location Center (E-SMLC), and a UE, while LPPa is the communication protocol between an eNB and the E-SMLC. The information exchange between eNB and a LCS Server, such as an E-SMLC, may be used for OTDOA positioning to support data collection from eNBs and configurations to eNBs. Such configuration information includes PRS configuration index table, number of consecutive PRS, PRS bandwidth, etc.

Despite the introduction of PRS and cell-specific frequency shifting, there still remains a need for enhancing positioning accuracy under at least some circumstances, such as under urban, indoor, or other rich multipath scenarios. This proves particularly true for enhancing US FCC Enhanced 911 capability to localize people in emergency. Yet any enhancement will most likely introduce coexistence issues in the case where legacy UEs may not understand or be capable of exploiting the enhancement.

The following references describe legacy systems for transmission of PRS that are associated with coexistence issues: 3GPP TS 36.211, Evolved Universal Terrestrial Radio Access (E-UTRA); Physical channels and modulation, v12.0.0; and 3GPP TS 36.455, Evolved Universal Terrestrial Radio Access (E-UTRA); LTE Positioning Protocol A (LPPa), v12.0.0.

SUMMARY

An object of embodiments herein is to improve the positioning of a wireless device in an efficient manner.

The object is achieved by providing a method, performed by a base station, for transmitting positioning reference signals (PRSs) in a cell served by the base station. The base station maps PRSs onto different groups of time-frequency resources according to different respective positioning reference signal (PRS) patterns, wherein each of the different groups of time-frequency resources spans one or more consecutive subframes in time. The base station transmits the PRSs in the cell in accordance with said mapping.

The object is further achieved by providing a method, performed by a wireless device, for receiving PRSs in a cell served by a base station. The wireless device receives from the base station at the wireless device in the cell PRSs that are mapped onto different groups of time-frequency resources according to different respective PRS patterns, wherein each of the different groups of time-frequency resources spans one or more consecutive subframes in time. The wireless device further measures the PRS of at least one group for determining a location of the wireless device.

The object is furthermore achieved by providing a method, performed by a positioning network node, for configuring transmission of PRSs in a cell served by a base station. The positioning network node generates configuration information comprising PRS configuration information and additional PRS configuration information, that configures mapping of PRSs onto different groups of time-frequency resources according to different respective PRS patterns, wherein each of the different groups spans one or more consecutive subframes in time and wherein the PRS configuration information and the additional PRS configuration information are applicable for a first one of the different groups of time-frequency resources and a second one of the different groups of time-frequency resources respectively. The positioning network node further transmits the configuration information to the base station (40) for mapping of the PRSs in accordance with the PRS configuration information and the additional PRS configuration information.

The object is achieved by providing a base station serving a cell. The base station is configured to map PRSs onto different groups of time-frequency resources according to different respective PRS, patterns, wherein each of the different groups spans one or more consecutive subframes in time. The base station transmits the PRSs in the cell in accordance with said mapping.

The object is achieved by providing a wireless device configured to operate in a cell served by a base station. The wireless device is configured to receive PRSs from the base station at the wireless device in the cell, wherein individual ones of the PRSs are mapped onto different groups of time-frequency resources according to different respective PRS patterns, wherein each of the different groups spans one or more consecutive subframes in time. The wireless device is further configured to measure the PRSs of at least one of the groups in order to enable determination of a location of the wireless device.

The object is additionally achieved by providing a positioning network node for configuring PRSs transmission in a cell served by a base station. The positioning network node is configured to generate configuration information comprising PRS configuration information and additional PRS configuration information, which configures mapping of PRSs positioning occasion, wherein individual ones of the PRSs are mapped onto different groups of time-frequency resources according to different respective PRS patterns, wherein each of the different groups spans one or more consecutive subframes in time and wherein the PRS configuration information and the additional PRS configuration information are applicable for a first one of the different groups of time-frequency resources and a second one of the different groups of time-frequency resources respectively. The positioning network node is further configured to transmit the configuration information to the base station for mapping of the PRSs in accordance with the PRS configuration information and the additional PRS configuration information.

Embodiments herein improve a correlation property of PRS by modifying transmission (e.g., scheduling) of PRS and the PRS pattern resulting in a more accurate determination of a location of the wireless device. This will thus improve the positioning of the wireless device in an efficient manner.

BRIEF DESCRIPTION OF THE DRAWINGS

Embodiments will now be described in more detail in relation to the enclosed drawings, in which:

FIG. 3 is a schematic flowchart depicting a method according to embodiments herein;

FIG. 4 is a schematic flowchart depicting a method according to embodiments herein;

FIG. 5 is a schematic flowchart depicting a method according to embodiments herein;

FIG. 7 is a schematic flowchart depicting a method according to embodiments herein;

DETAILED DESCRIPTION

Figure 1A:
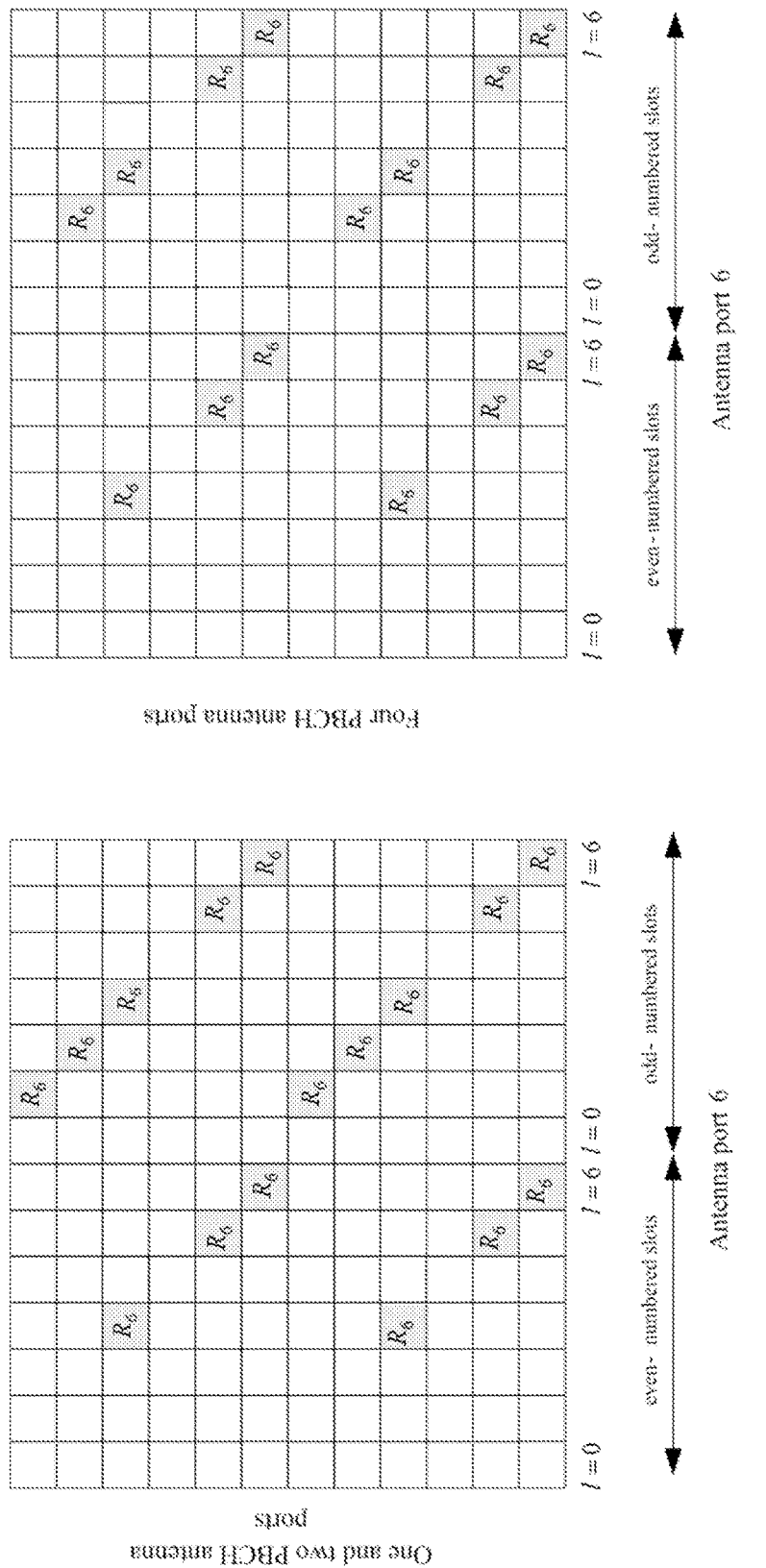
FIG. 1a shows a mapping of positioning reference signals (normal cyclic prefix) as described in 3GPP TS 36.211, Evolved Universal Terrestrial Radio Access (E-UTRA); Physical channels and modulation, v12.0.0.
Figure 1B:
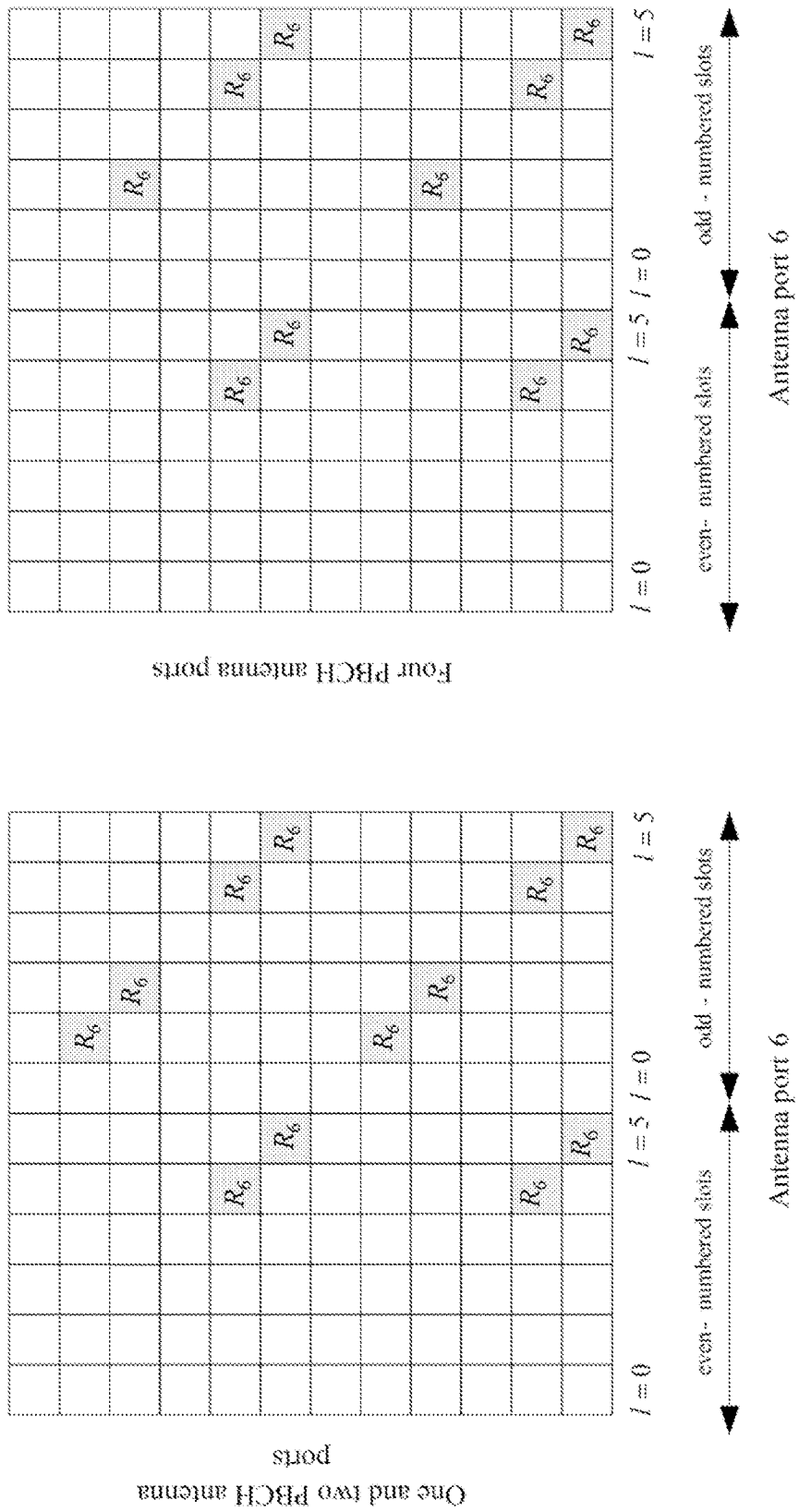
FIG. 1b shows a mapping of positioning reference signals (extended cyclic prefix) as described in 3GPP TS 36.211, Evolved Universal Terrestrial Radio Access (E-UTRA); Physical channels and modulation, v12.0.0.
Figure 2A:
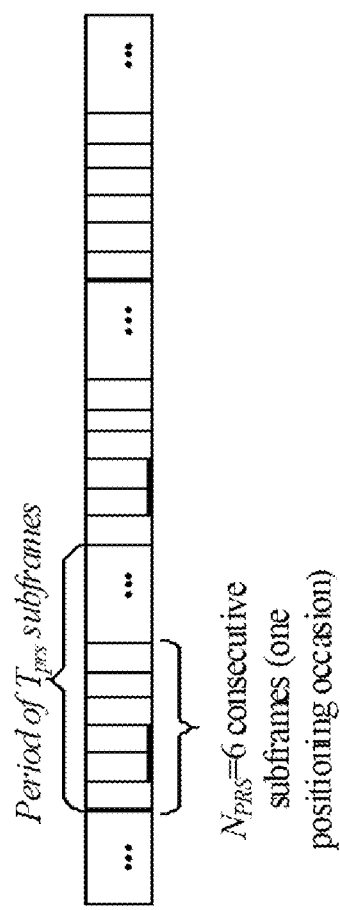
FIG. 2a shows a positioning subframe allocation in an LTE legacy system for a single cell.
Figure 2B:
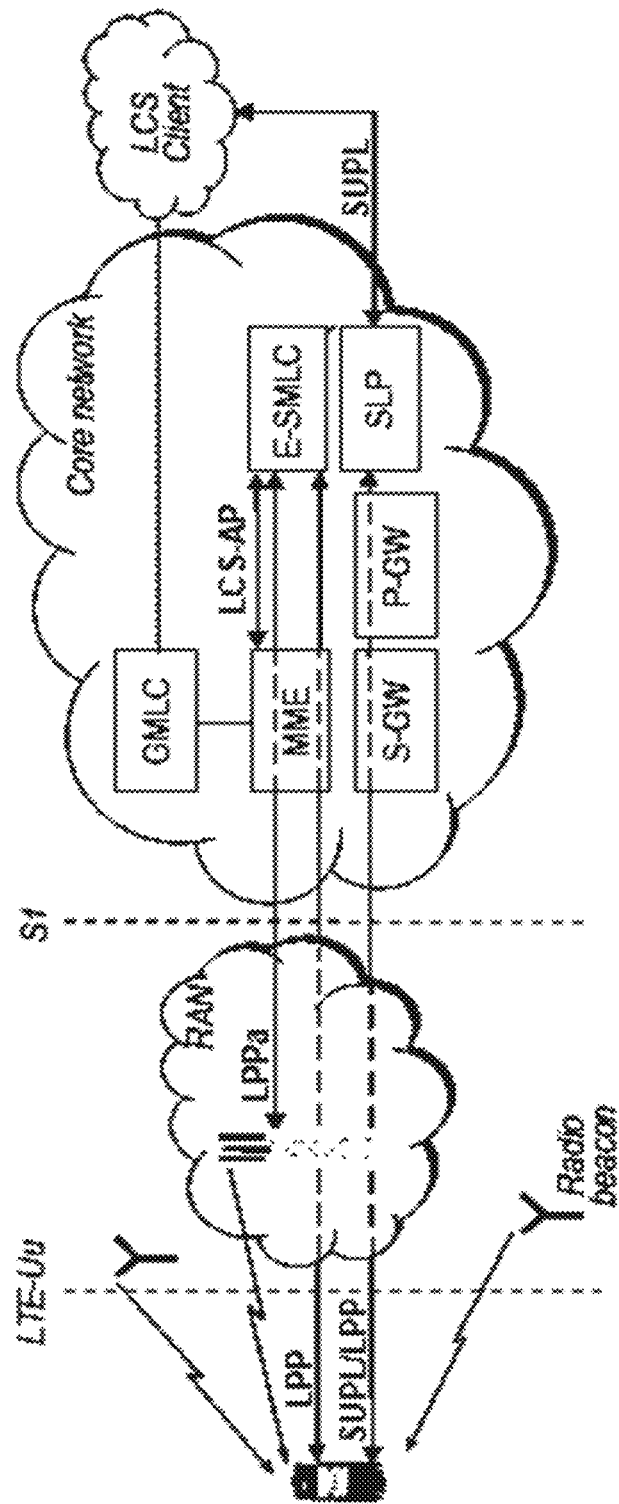
FIG. 2b shows a positioning architecture in LTE.

Embodiments herein improve the mapping of positioning reference signals (PRSs) onto time-frequency resources for transmission and corresponding reception. One or more embodiments for example, map PRSs onto different groups of time-frequency resources according to different respective PRS patterns. Alternatively or additionally, one or more embodiments map PRSs onto time-frequency resources within each of multiple consecutive subframes of a positioning occasion according to different PRS patterns for at least two of those subframes, in which the different PRS patterns are frequency shifted relative to one another. For rich-multipath scenarios, in particular indoor environments, when the receiver carries out TOA estimation by searching for the maximum correlation peak, the side-lobes create more uncertainty and potential errors. These embodiments enables better correlation property an hence, These embodiments prove advantageous, for example, in enhancing positioning accuracy in urban, indoor, or other challenging multi-path radio environments, while resolving coexistence concerns with legacy devices not capable of recognizing at least some of the PRS patterns used.

In more detail, some embodiments include a method for transmitting PRSs in a cell served by a base station. The method comprises mapping PRSs onto different groups of time-frequency resources according to different respective PRS patterns. Each of the different groups spans one or more consecutive subframes in time. In some embodiments, the different groups of time-frequency resources are separated in time so as to constitute two individual positioning occasions. In other embodiments, the different groups of time-frequency resources are separated in frequency so as to constitute a single individual positioning occasion. The method also comprises transmitting the PRSs in the cell in accordance with the mapping. FIG. 3 shows such a method.

Such embodiments for transmission of PRSs may be implemented by a base station serving the cell that is configured to perform such methods.

Some embodiments include a corresponding method for receiving the transmitted PRSs in a cell served by the base station, see FIG. 4. The method comprises receiving PRSs from the base station at the UE in the cell that are transmitted with the mapping as explained above. The method also comprises measuring the PRSs for determining the location of the UE.

Such embodiments for reception of PRSs may be implemented by a user equipment in a cell served by a base station transmitting such PRSs, and the user equipment is configured to perform such methods.

In one or more embodiments, the above methods further comprise receiving different PRS configuration information for the different groups from a positioning server and determining the mapping in accordance with the different PRS configuration information.

Other embodiments herein correspondingly include a method for configuring transmission of positioning reference signals (PRSs) in a cell served by a base station. The method includes generating configuration information that configures mapping of PRSs onto different groups of time-frequency resources according to different respective PRS patterns. Each of the different groups spans one or more consecutive subframes in time. Such groups may be separated in time and/or in frequency as described above. The method further comprises transmitting the configuration information to the base station for mapping of the PRSs in accordance with the configuration information.

In one or more embodiments the method in FIG. 5 is implemented by an Enhanced-Serving Mobile Location Center (E-SMLC) in an LTE system. However, other positioning network nodes in the LTE system or in other system architectures may be used to configure the PRS configuration information.

In one or more embodiments, generating configuration information comprises generating the configuration information to include different PRS configuration indexes for different configuration tables that govern the configuration of PRSs mapped onto the different groups. Each of the configuration tables, for example, may define different possible PRS positioning occasion periodicities and/or different possible PRS subframe offsets indexed by different possible PRS configuration indexes.

In any of these methods, the different groups of time-frequency resources are transmitted periodically in at least some embodiments. In this case, the transmission periodicity of PRSs mapped onto one of the different groups may be the same or a multiple of the transmission periodicity of PRSs mapped onto another one of the different groups.

In any of these methods, the different PRS patterns may be configured for different radio environments. For example, at least one of the PRS patterns may be configured for an outdoor radio environment and at least another one of the PRS patterns may be configured for an indoor radio environment. Additionally or alternatively, at least one of the PRS patterns may be configured for a rural radio environment and at least another one of the PRS patterns may be configured for an urban radio environment.

In any of these methods, some UEs in the cell may be configured to measure only the PRSs mapped onto a first one of the groups and other UEs in the cell may be configured to measure the PRSs mapped onto both the first one of the groups and a second one of the groups. Thus, for example, a legacy UE may only be capable of measuring PRSs mapped onto the first group because the legacy UE is not aware that PRSs are mapped onto the second group. New UEs that are aware of the additional PRSs mapped onto the second group, though, may measure these additional PRSs. Thus, such methods may allow for backward compatibility with legacy UEs.

In accordance with any of the methods, different groups of time-frequency resources may be separated in time so as to constitute two individual positioning occasions. Alternatively, different groups of time-frequency resources may be separated in frequency so as to constitute a single individual positioning occasion.

In embodiments where the different groups of time-frequency resources are separated in time, the two individual positioning occasions may be immediately adjacent in time so as to collectively form a continuous positioning occasion. Alternatively, a gap may separate the two individual positioning occasions, such that they are not a continuous positioning occasion. In either case, though, a PRS subframe offset for PRSs mapped onto one of the different groups may be different than and defined relative to a PRS subframe offset for PRSs mapped onto another one of the different groups.

In any of the methods, the PRSs mapped onto at least one of the different groups may be mapped onto time-frequency resources within each of multiple consecutive subframes of the group according to different PRS patterns for at least two of those subframes. In at least some embodiments, those different PRS patterns are a function of cell identity and subframe number. For example, different PRS patterns may be frequency shifted relative to one another based on the subframe number.

In any of these methods, the different groups may span a different number of subframes. Additionally or alternatively, the different groups of time-frequency resources may comprise a first group and a second group, and the number of subframes spanned by the first group is no greater than 6 or the total of the subframes spanned by the first group and the second group is no greater than 6.

Further embodiments may improve the correlation property of PRS by improving the time-frequency pattern of PRS. Such embodiments may be used in addition or separately from the above described embodiments.

Figure 6:
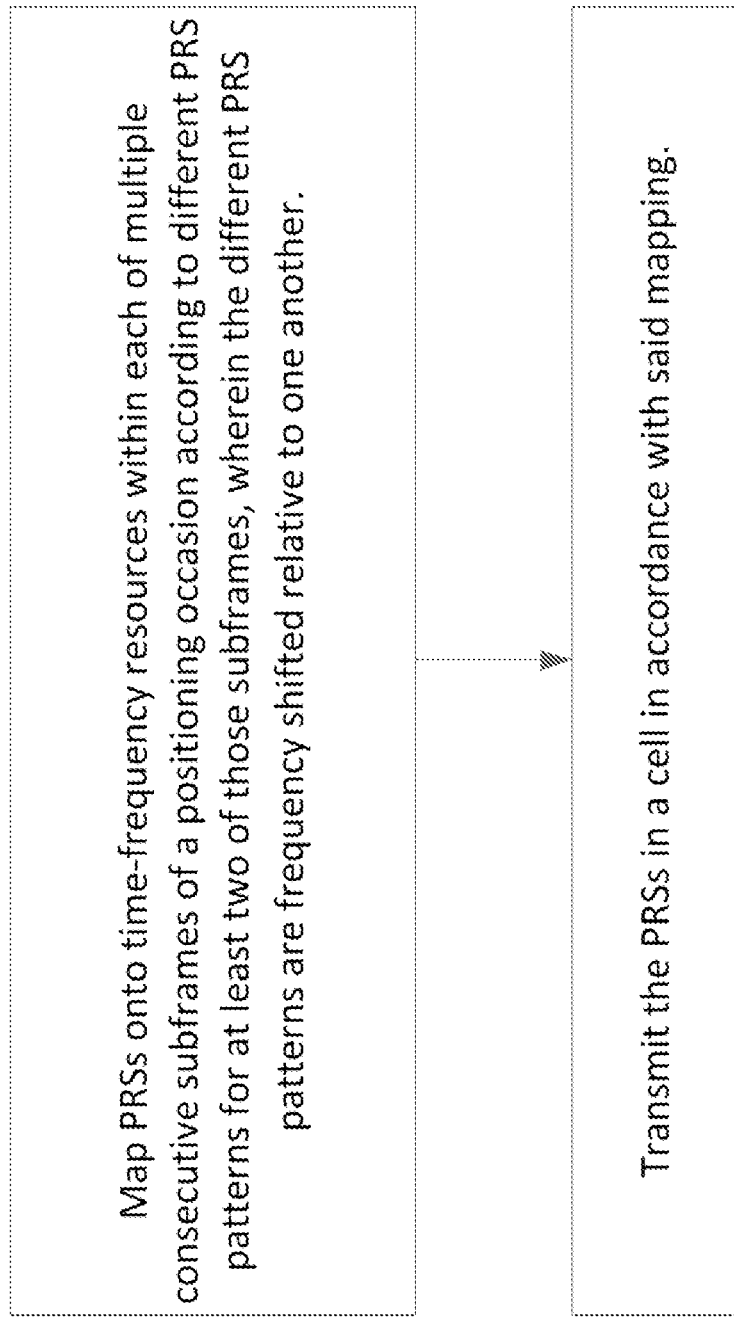
FIG. 6 is a schematic flowchart depicting a method according to embodiments herein.

Such embodiments include a method for transmitting PRSs in a cell served by a base station. The method, as shown in FIG. 6, comprises mapping PRSs onto time-frequency resources within each of multiple consecutive subframes of a positioning occasion according to different PRS patterns for at least two of those subframes. The different PRS patterns are frequency shifted relative to one another (e.g., as a function of subframe number). The method also comprises transmitting the PRSs in the cell in accordance with the mapping. In some embodiments, the methods for such transmitting of PRSs is implemented by a base station serving a cell configured to perform such methods.

Such embodiments also include a method for receiving PRSs in a cell served by a base station. The method, as shown in FIG. 7, comprises receiving PRSs from the base station at a UE in the cell. The individual ones of the PRSs are mapped onto time-frequency resources within each of multiple consecutive subframes of a positioning occasion according to different PRS patterns for at least two of those subframes. The different PRS patterns are frequency shifted relative to one another (e.g., as a function of subframe number). The method further comprises measuring the PRSs for determining a location of the UE. In such embodiments, the methods for such reception of PRSs is implemented by a UE configured to perform such methods.

In any of these methods, the different PRS patterns may be shifted in frequency by one subcarrier from subframe to subframe. In this way better correlation property to reduce sidelobes may be obtained.

In any of these methods, the different PRS patterns may be associated with different subframe numbers.

In some embodiments, the methods further comprise receiving signaling indicating the frequency shift associated with different PRS patterns.

Embodiments herein also include corresponding apparatus, computer programs, and carriers containing such computer programs.

Embodiments herein may improve the correlation property of PRS by modifying transmission (e.g., scheduling) of PRS and the time-frequency pattern of PRS. In an LTE scenario with legacy and new UEs, for example, embodiments are transparent to legacy UEs, i.e., legacy UEs can still base positioning measurements on the legacy PRSs without interference from new PRSs. The new UEs, on the other hand, are able to make use of both legacy PRSs and new PRSs for positioning.

For example, with the new PRS configuration separation in the time domain, the new PRS subframe offset may be adjusted relative to the legacy one such that new and legacy PRS subframes can line up in time to form a longer positioning occasion. The time-frequency pattern of the new PRS can achieve a better correlation property by introducing frequency shifts relative to a neighboring subframe. The new PRS pattern can be considered as a new antenna port seen from new UEs' perspective. At the receiver side, when performing time of arrival (TOA) estimation, new UEs are configured to look into both legacy and new PRS antenna ports and perform autocorrelation based on both.

Of course, embodiments herein are not limited to the above features and advantages. Indeed, those skilled in the art will recognize additional features and advantages upon reading the following detailed description, and upon viewing the accompanying drawings. For example, mapping of PRSs may comprise mapping to different groups of resources other than time-frequency resources for separating the different groups, such as separating by space-division, polarization-division, code-division, and other radio resource division.

Figure 8:
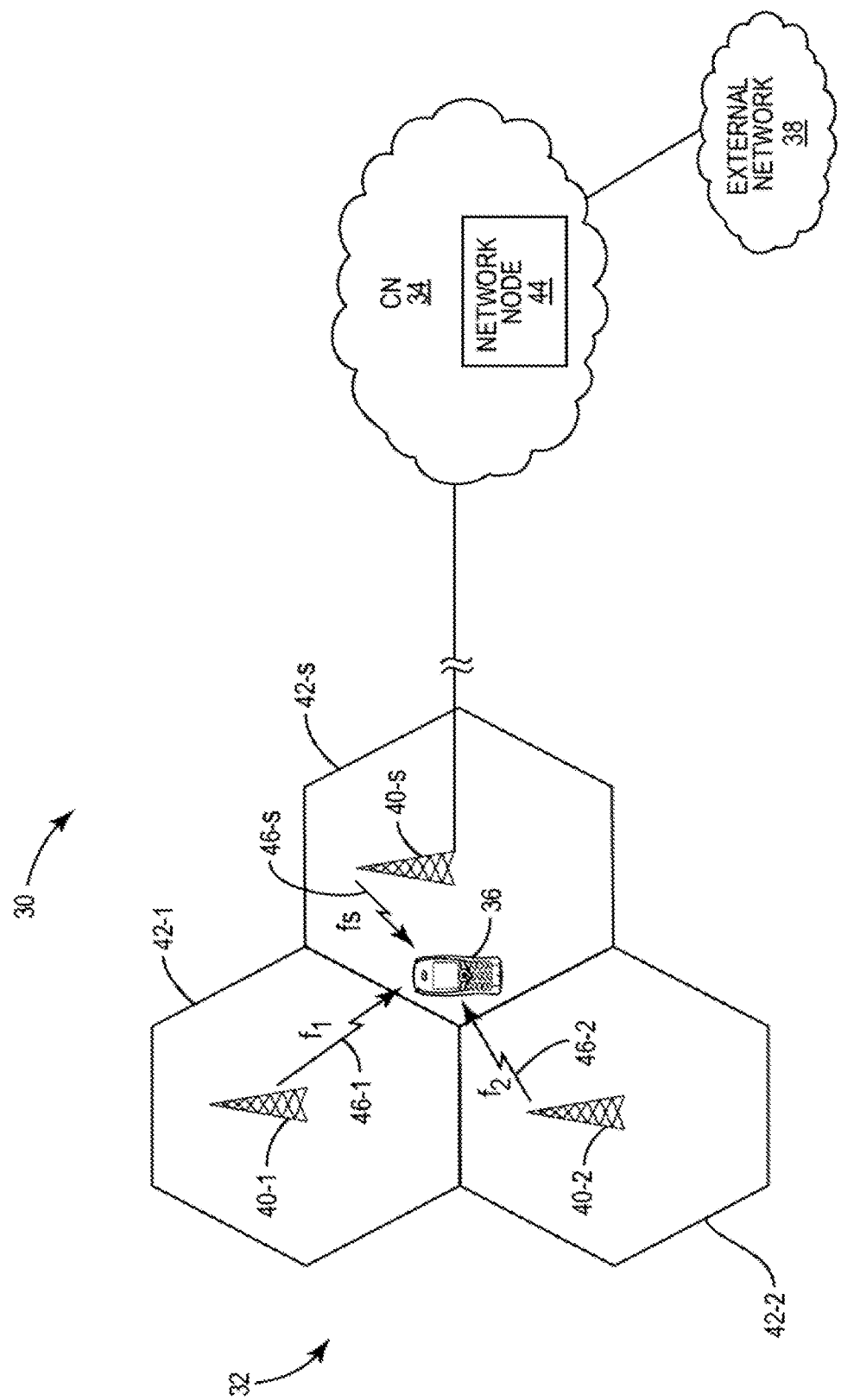
FIG. 8 shows a wireless communication system according to one or more embodiments.

FIG. 8 depicts a simplified example of a wireless communication system 30 according to one or more embodiments. As shown, the wireless communication system 30 includes a Radio Access Network (RAN) 32, a Core Network (CN) 34, and one or more wireless devices (or user equipment) 36. The RAN 32 and CN 34 enable a wireless device 36 to access one or more external networks 38, such as the Public Switched Telephone Network (PSTN) or the Internet.

The RAN 32 includes a number of base stations 40 that are geographically distributed across the wide geographic area served by the wireless communication system 30. Each base station 40 provides radio coverage for one or more respective portions of that geographic area, referred to as cells 42 or service areas. As shown, for example, a first base station 40-1 serves wireless devices within a first cell 42-1, a second base station 40-2 serves wireless devices within a second cell 42-2, and so on. Because of this, the wireless device 36 may move within or between cells 42 and may communicate with one or more base stations 40 at any given position.

In this regard, FIG. 8 depicts the particular wireless device 36 that, at its current position, is served by a serving base station 40-s. Thus, from the perspective of this wireless device 36, the base station 40-s is the serving base station and a serving cell 42-s is the serving cell. The other cells 42-1 and 42-2 are physically neighboring the serving cell 42-s in the sense that they are geographically adjacent to the serving cell 42-s. These cells 42-1 and 42-2 are thus appropriately referred to as neighboring cells.

Each of the cells 42, via its corresponding base station 40, periodically transmits a so-called positioning reference signal (PRS) 46. A positioning reference signal 46 as used herein is specifically designed, e.g. with good signal quality, to be a signal on which a wireless device performs positioning measurements. These positioning measurements are to be used by the wireless device 36 itself, or some other network node 44 in the core network 34, e.g., a positioning node, for determining the device's geographic position. In some embodiments, for example, such positioning measurements comprise timing measurements. In such a case, the wireless device 36 may measure timing differences, e.g., RSTD, Rx-Tx time differences, or Timing Advance (TA), between the different positioning reference signals 46 received from the different cells 42. These timing differences are then used to estimate the device's position with respect to the different cells 42.

Figure 9:
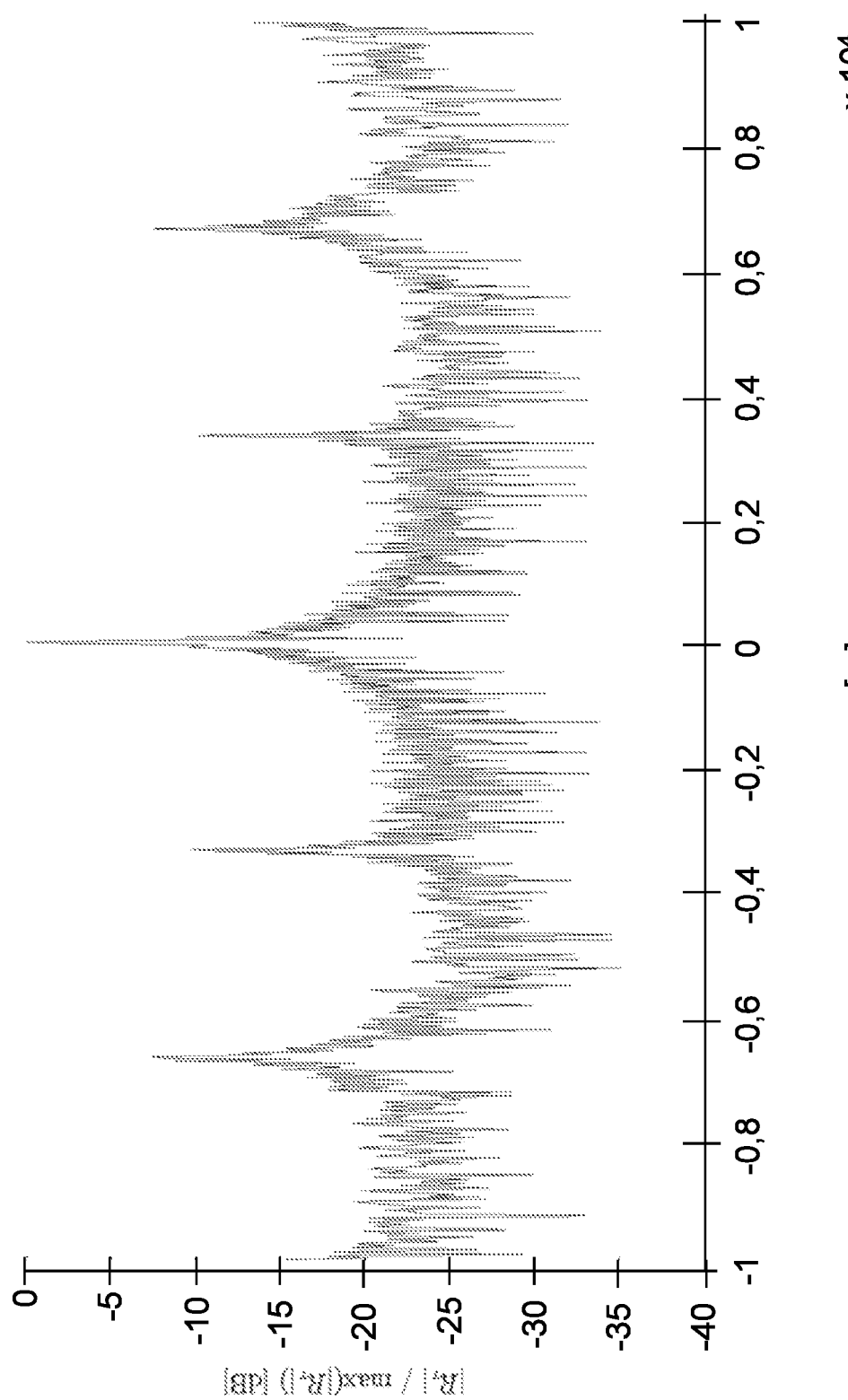
FIG. 9 shows an autocorrelation output of current PRS pattern with normal CP.
Figure 10:
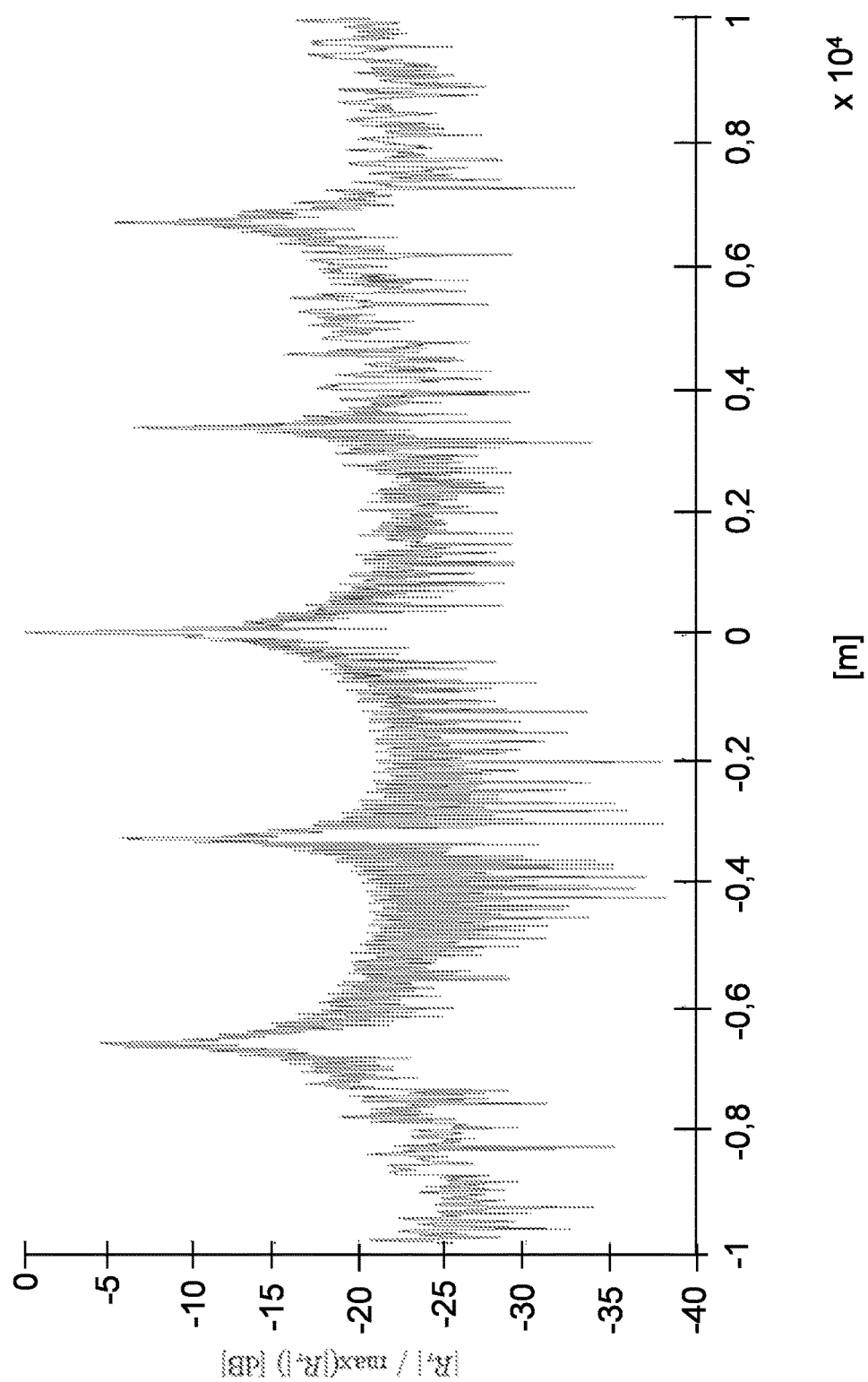
FIG. 10 shows an autocorrelation output of current PRS pattern with extended CP.

For rich-multipath scenarios such as indoor, the correlation property of the current PRS time-frequency pattern that was designed mainly for outdoor positioning is not that satisfying. FIG. 9 and FIG. 10 show the autocorrelation output of the existing PRS pattern for normal CP and extended CP, respectively. In both cases, periodical strong side-lobes are observed. For rich-multipath scenarios, in particular indoor environments, those side-lobes create more uncertainty and potential errors when the receiver carries out Time of Arrival (TOA) estimation by searching for the maximum correlation peak. This leads to degraded performance of TOA estimation and hence, compromises the positioning accuracy.

A new time-frequency PRS pattern that can achieve a better correlation property is needed, in particular for positioning in in-building and challenging urban environments. With the new PRS pattern, a coexistence issues arises: legacy UEs cannot understand the new pattern and the new pattern would introduce interference. Therefore, to keep backward compatibility, a new mechanism is introduced such that legacy UEs can carry out positioning based on legacy pattern without interference and new UEs can achieve better positioning performance based on the new PRS.

According to one or more embodiments, a new group of subframes containing new PRS are introduced to each PRS occasion that contains existing PRS specified in current standard (called legacy PRS hereafter). The new group of PRS subframes may follow the same configuration as the legacy one in terms of PRS occasion period and number of consecutive PRS subframes. The new group however may differ in PRS subframe offset and resource element (RE) mapping to the resource blocks.

Figure 11:
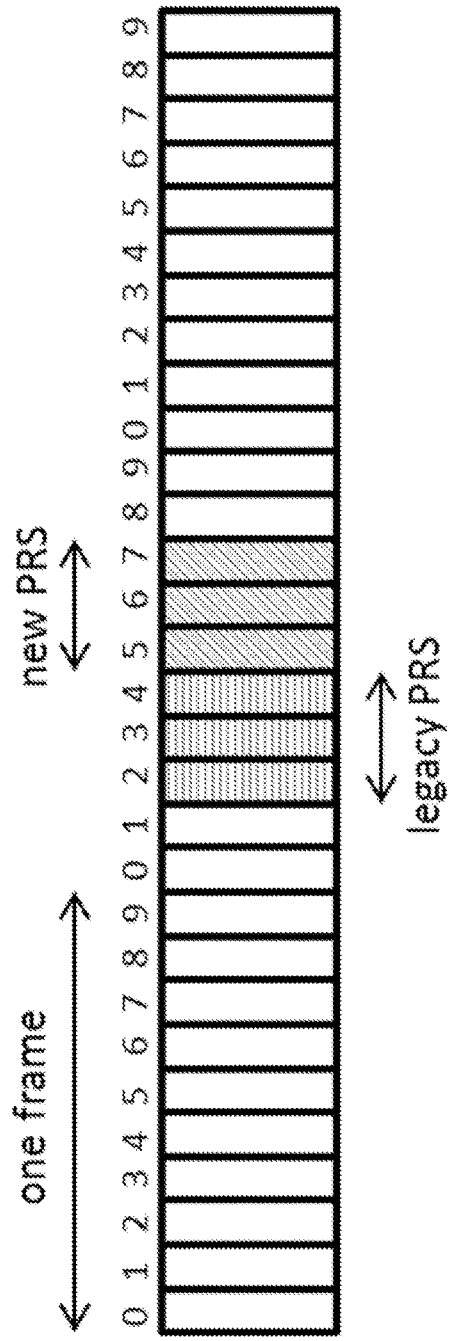
FIG. 11 is an illustration of the PRSs in one positioning occasion according to embodiments herein.

The subframe offset of the new PRS could be configured based on the associated legacy PRS such that the legacy PRS and new PRS are located in adjacent subframes. An example of such configuration is shown in FIG. 11, where each positioning occasion is composed of consecutive $N_{PRS}=3$ subframes. The group of new PRS, diagonally striped, is transmitted in the next 3 subframes after the legacy PRS, horizontally striped, and hence, there are total six consecutive PRS subframe that new UEs can make use of for positioning. Alternatively, the new PRS may be transmitted for example in subframes 7,8, and 9, leaving a gap of subframes 5 and 6.

Such scheduling of the new PRS transmission is characterized by a new PRS configuration index table, which defines a new subframe offset such that the groups of legacy and new PRS subframes are adjacent to each other. An example of such table is shown in Table 2, where $m=N_{PRS}$. Another possibility is that $m=N_{PRS}$, which means the new PRS is transmitted before the legacy one and continuity is still satisfied, such that the new PRS and legacy PRS defines a "continuous positioning occasion". Of course, $N_{PRS}$ can be configured to leave a subframe gap such that it would not be a "continuous positioning occasion".

TABLE 2

Subframe configuration for new PRS

| PRS configuration Index $I'_{PRS}$ | PRS periodicity $T'_{PRS}$ (subframes) | PRS subframe offset $\Delta'_{PRS}$ (subframes) |
|---|---|---|
| 0-159 | 160 | $I'_{PRS} + m$ |
| 160-479 | 320 | $I'_{PRS} - 160 + m$ |

TABLE 2-continued

Subframe configuration for new PRS

| PRS configuration Index $I'_{PRS}$ | PRS periodicity $T'_{PRS}$ (subframes) | PRS subframe offset $\Delta'_{PRS}$ (subframes) |
|---|---|---|
| 480-1119 | 640 | $I'_{PRS} - 480 + m$ |
| 1120-2399 | 1280 | $I'_{PRS} - 1120 + m$ |
| 2400-4095 | Reserved | |

In a further embodiment, the new PRS may have more subframes than the legacy to achieve even better correlation, and it is not necessary to limit it to maximum of 6 subframes as in current legacy systems. For example, 6-subframe legacy PRS and 8-subframe new PRS can form a 14-subframe long PRS for some extreme channel conditions. In general, a separate parameter $N'_{PRS}$ is defined for the new PRS, which is transmitted in $N'_{PRS}$ consecutive downlink subframes and $N'_{PRS}$ is configured by higher layers.

In another embodiment, the maximum total number of subframes containing PRS or the new PRS in one occasion is limited to six. That is $N_{PRS} + N'_{PRS} <= 6$, while both $N_{PRS}$ and $N'_{PRS}$ are individually configured. This makes sure that the resources taken away from data transmission for positioning purpose is limited and is no more than maximum legacy overhead.

In another embodiment, the total number of subframes containing PRS or the new PRS in one occasion is fixed to $N_{PRS,0}$, which can be predefined in the specification or signaled via higher layer signaling. The number of subframes for new PRS can be determined by $N'_{PRS} = N_{PRS,0} - N_{PRS}$.

Generic PRS Configuration

In the above embodiments, it is assumed that the new PRS is configured with the same periodicity as legacy PRS. As shown in Table 2, a proper subframe offset $\Delta'_{PRS}$ enables the new PRS and legacy PRS to completely line up as a continuous PRS. In another embodiment, a general case is that the new PRS has a different periodicity $T'_{PRS}$, which is Q times as long as the periodicity of legacy PRS, that is, $T'_{PRS} = Q \times T_{PRS}$. Physically it means that the new PRS can line up with one of every Q legacy PRS. To enable this, an extra subframe offset should be configured as shown in Table 3.

TABLE 3

Subframe configuration for new PRS with different periodicity

| PRS configuration Index $I'_{PRS}$ | PRS periodicity $T'_{PRS}$ (subframes) | PRS subframe offset $\Delta'_{PRS}$ (subframes) |
|---|---|---|
| 0-159 | 160*Q | $I'_{PRS} + T'_{PRS} + m$ |
| 160-479 | 320*Q | $I'_{PRS} - 160 + T'_{PRS} + m$ |
| 480-1119 | 640*Q | $I'_{PRS} - 480 + T'_{PRS} + m$ |
| 1120-2399 | 1280*Q | $I'_{PRS} - 1120 + T'_{PRS} + m$ |
| 2400-4095 | Reserved | |

At the UE receiver side, the part of new PRS is transparent to legacy UEs. New UEs have two PRS configuration index tables, legacy and new, based on which new UEs perform auto-correlation to corresponding subframes.

Figure 12:
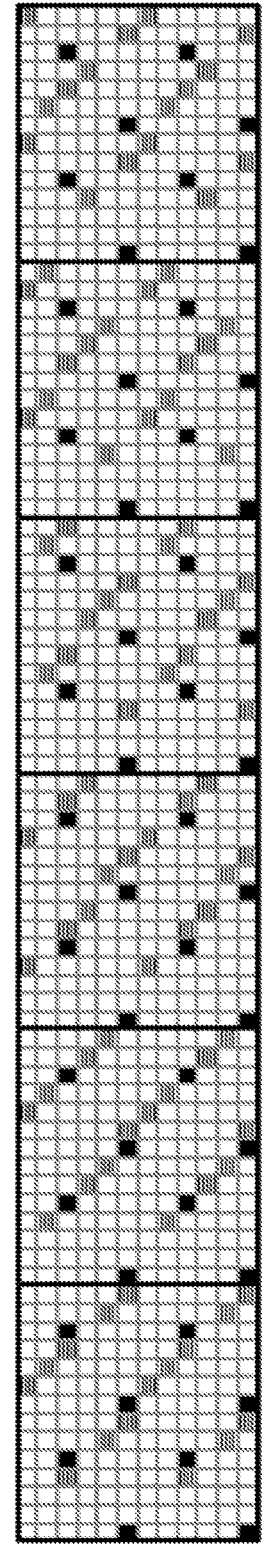
FIG. 12 is an illustration of the frequency-shift PRS pattern according to embodiments herein.

In one or more embodiments, instead of repeating the same PRS pattern in each subframe of one positioning occasion, the new PRS pattern in one subframe applies a frequency shift relative to the previous subframe. Such frequency shift can be associated to the subframe number in the same occasion such that there is no explicit signaling needed to inform UEs about the frequency shift. One example of the frequency-shift pattern is shown in FIG. 12, in which the PRS pattern, horizontally striped, in each subframe shifts one subcarrier relative to previous subframe while the positions of CRS, marked as black resource elements, remain the same.

A frequency shift may be determined by a function of cell ID and the subframe number, i.e., $$v_{shift}(N_{ID}^{Cell}, n_{subframe}) = f(N_{ID}^{Cell}, n_{subframe})$$

For example, the above shift-1 (shift one subcarrier in frequency) example can be expressed by $$v_{shift} = (N_{ID}^{Cell} n_{subframe}) \bmod 6$$

Then the procedure of PRS mapping to the resource element (k,l) on each subframe can be modified to 1. Normal Cyclic Prefix:

$$k = 6(m + N_{RB}^{DL} - N_{RB}^{PRS}) + (6 - l + v_{shift}(N_{ID}^{Cell}, n_{subframe})) \bmod 6$$

$$l = \begin{cases} 3, 5, 6 & \text{if } n_s \bmod 2 = 0 \\ 1, 2, 4, 5, 6 & \text{if } n_s \bmod 2 = 1 \text{ and } (1 \text{ or } 2 \\ & PBCH \text{ antenna ports}) \\ 2, 3, 4, 5 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

2. Extended Cyclic Prefix:

$$k = 6(m + N_{RB}^{DL} - N_{RB}^{PRS}) + (5 - l + v_{shift}(N_{ID}^{Cell}, n_{subframe})) \bmod 6$$

$$l = \begin{cases} 4, 5 & \text{if } n_s \bmod 2 = 0 \\ 1, 2, 4, 5 & \text{if } n_s \bmod 2 = 1 \text{ and } (1 \text{ or } 2 \text{ } PBCH \text{ antenna ports}) \\ 2, 4, 5 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

Figure 13:
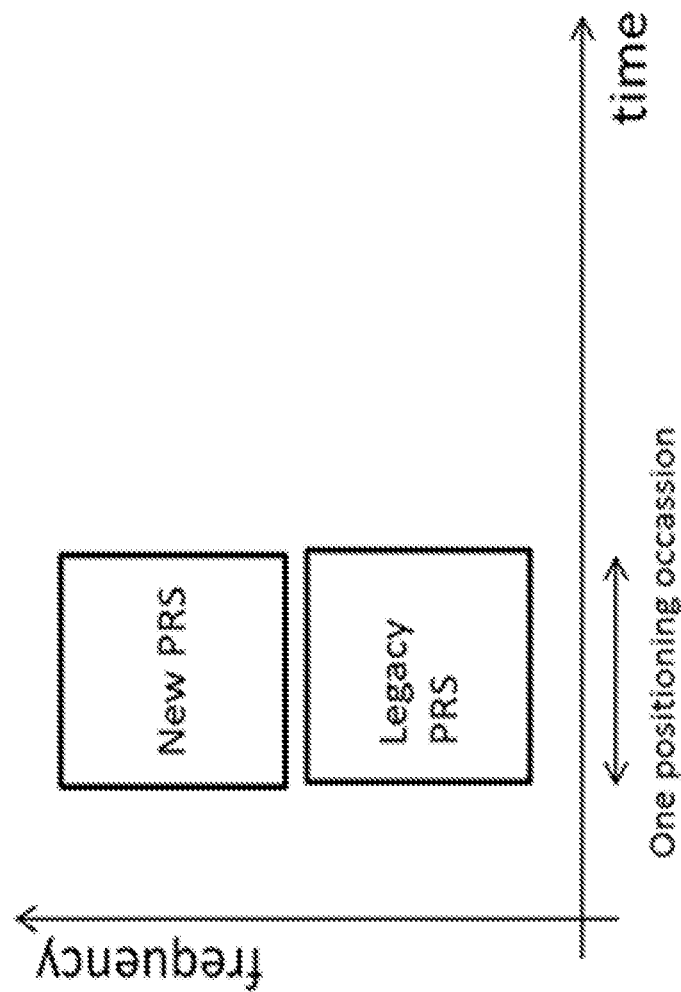
FIG. 13 is a schematic overview depicting groups of different frequencies according to embodiments herein.

In another embodiment, in order to ensure the co-existence, the new PRS and the legacy PRS are assigned to different parts of the system bandwidth of the cell. An example is illustrated in FIG. 13 below. Legacy PRS has been configured to transmit over one part of the bandwidth. The new PRS may use another part of bandwidth that does not overlap with that of legacy PRS. In this case, there is no need to have a new PRS configuration index table (for time) but the extra configuration is required for frequency-domain allocation. In LTE, the frequency-domain allocation is in terms of location and size of Physical Resource Blocks (PRBs). For legacy PRS, the bandwidth for positioning reference signals $N_{RB}^{PRS}$ is configured by higher layers. For the new PRS, a new parameter is configured by higher layer signaling to indicate the bandwidth of new PRS.

Several variations are possible. In one variation, a consecutive block of PRBs for new PRS transmission. In another variation, two half blocks, each of size $N_{RB}^{PRS}$ PRBs, one placed above (in terms of frequency) the legacy PRS, the other placed below (in terms of frequency) the legacy PRS. In an additional variation, the new PRS is preferably placed adjacent to the legacy PRS, in which case no additional signaling is necessary. Nevertheless it is possible that the new PRS may be placed at a frequency location not immediately adjacent to the legacy PRS.

In another example, new PRS is only transmitted on another carrier frequency. New UEs can perform positioning based on the PRSs on both carrier frequencies, legacy PRS on one carrier frequency, in a carrier aggregation way. Specifically, the new PRS is transmitted in a second component carrier, while transmitting the legacy PRS on a first component carrier of the same base station. The first component carrier is assigned a first physical cell ID (PCID), and the second component carrier is assigned a second PCID, which is different from the first PCID. However, it can be configured such that the base station transmits PRS on the first and the second component carriers simultaneously, such that the UE can use the PRS from both component carriers simultaneously. The new PRS in the second component carrier can use a sequence and/or RE mapping different from the legacy PRS.

In another embodiment, new PRS may be transmitted using the same time-frequency resources occupied by the legacy PRS, in terms of subframe(s) in the time domain and PRB(s) in the frequency domain. In this case, the new PRS may use the same sequence and pattern as the legacy PRS, or a different sequence and/or pattern. In one example, they are separated in spatial domain by pre-coding. For example, a large antenna array is able to form two vertical beams, one sending legacy PRS while the other is sending new PRS. Alternatively, a new antenna port (AP) 6' is defined to transmit the new PRS, while the existing antenna port 6 transmits the legacy PRS in the same subframe.

To enable a new PRS, the signaling for the corresponding configuration may be through LPPa. Additional configuration information should be added to the OTDOA cell information described in 3GPP TS 36.455, Evolved Universal Terrestrial Radio Access (E-UTRA); LTE Positioning Protocol A (LPPa), v12.0.0, Section 9.2.7. Legacy configuration information shall remain to keep backward compatibility, and the information for new PRS, as shown in Table 4, should include, underlined and bold, "PRS configuration index-secondary" and "number of DL frames-secondary", to configure scheduling and the contained number of PRS subframes, respectively.

TABLE 4

OTDOA cell information

| IE/Group Name | Presence | Range | IE type and reference | Semantics description |
|---|---|---|---|---|
| OTDOA Cell Information | | 1 ... <maxnoOTDOAtypes> | | |
| >CHOICE OTDOA Cell Information Item | M | | | |
| >>PCI | M | | INTEGER (0 ... 503, ...) | Physical Cell ID |
| >>Cell ID | M | | ECGI 9.2.6 | |
| >>TAC | M | | OCTET STRING(2) | Tracking Area Code |
| >>EARFCN | M | | INTEGER (0 ... 65535, ..., 65536 ... 262143) | Corresponds to $N_{DL}$ for FDD and $N_{DL/UL}$ for TDD in ref. TS 36.104 |
| >>PRS Bandwidth | M | | ENUMERATED (bw6, bw15, bw25, bw50, bw75, bw100, ...) | Transmission bandwidth of PRS |
| >>PRS Configuration Index | M | | INTEGER (0 ... 4095, ...) | PRS Configuration Index, ref TS 36.211 |
| >>PRS Configuration Index-secondary | O | | INTEGER(0...4095, ...) | PRS Configuration Index-secondary |
| >>CP Length | M | | ENUMERATED (Normal, Extended, ...) | Cyclic prefix length of the PRS |
| >>Number of DL Frames | M | | ENUMERATED (sf1, sf2, sf4, sf6, ...) | Number of consecutive downlink subframes $N_{PRS}$ with PRS, ref TS 36.211 |
| >>NumberofDL Frames-secondary | M | | ENUMERATED (sf1,sf2,sf4, sf6,...) | Numberof consecutive downlink subframesNPRS withPRS,refTS 36.211 |
| >>Number of Antenna Ports | M | | ENUMERATED(n1-or-n2, n4, ...) | Number of used antenna ports, where n1-or-n2 corresponds to 1 or 2 ports, n4 corresponds to 4 ports |

TABLE 4-continued

| | | | | |
|---|---|---|---|---|
| | | | OTDOA cell information | |
| IE/Group Name | Presence | Range | IE type and reference | Semantics description |
| >>SFN Initialisation Time | M | | BIT STRING (64) | Time in seconds relative to 00:00:00 on 1 January 1900 (calculated as continuous time without leap seconds and traceable to a common time reference) where binary encoding of the integer part is in the first 32 bits and binary encoding of the fraction part in the last 32 bits. The fraction part is expressed with a granularity of 1/2**32 second. |
| >>E-UTRAN Access Point Position | M | | 9.2.8 | The configured estimated geographical position of the antenna of the cell. |
| >>PRS Muting Configuration | M | | 9.2.9 | The configuration of positioning reference signals muting pattern, when applicable |

In TS 36.355, the OTDOA-ReferenceCellInfo should be updated to include the new PRS. For example:

```
-- ASN1START
OTDOA -ReferenceCellInfo ::= SEQUENCE {
   physCellId          INTEGER (0..503),
   cellGlobalId        ECGI                          OPTIONAL,    -- Need ON
   earfcnRef           ARFCN-ValueEUTRA              OPTIONAL,    -- Cond NotSameAsServ0
   antennaPortConfig   ENUMERATED (ports1-or-2, ports4, ... }
                                                     OPTIONAL,    -- Cond NotSameAsServ1
   cpLength            ENUMERATED { normal, extended, ... },
   prsInfo             PRS-Info                      OPTIONAL,    -- Cond PRS
   prsInfo-secondary   PRS-Info-secondary            OPTIONAL,    -- Cond PRS
   ...,
   [ [ earfcnRef-v9a0  ARFCN-ValueEUTRA-v9a0         OPTIONAL     -- Cond NotSameAsServ2
   ] ]
}
-- ASN1STOP
```

PRS-Info-Secondary

The IE PRS-Info provides the information related to the configuration of PRS in a cell. The specification should include such information for new PRS, underlined and bold, for example PRS-info-secondary, which include all existing configuration entries for legacy PRS and may also include additional configuration information for new PRS only.

```
-- ASN1START
PRS-Info-secondary ::= SEQUENCE {
    prs-ConfigurationIndex INTEGER (0..4095),
    numDL-Frames         ENUMERATED {sf-1, sf-2, sf-4, sf-6, ...},
    ...,
}
-- ASN1STOP
```

Note that the new PRS configuration is highly correlated to legacy PRS configuration in both time and frequency domain. Thus, some PRS-info parameters of legacy PRS are not needed for the new PRS. Rather, the legacy PRS configuration is applied to the new PRS. These PRS-info parameters include:
  prs-Bandwidth;
  prs-MutingInfo-r9;
Advantages of the proposed solution may include that
  1. Embodiments can efficiently improve the correlation property of PRS and hence the accuracy of TOA estimation.
  2. Embodiments can increases the UE hearability to PRS.
  3. Some embodiments are transparent to legacy UEs and therefore, keeps the backward compatibility.
  4. There is no extra complexity required to implement the proposed method and the modification to speciation has been reduced to minimum.

Figure 14:
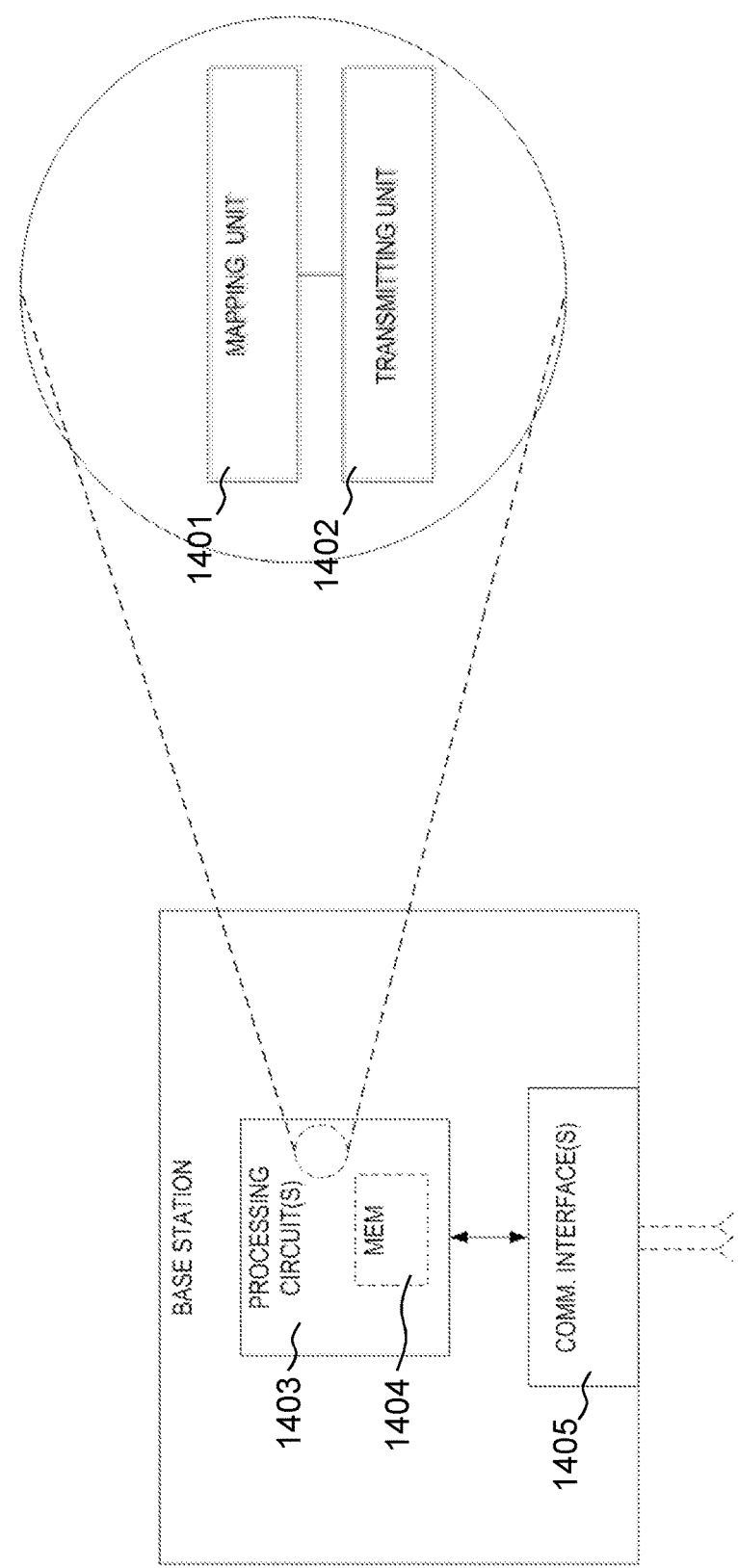
FIG. 14 is a block diagram depicting a base station according to embodiments herein.

Embodiments also include corresponding apparatus. Embodiments for instance include a base station serving a cell. FIG. 14 illustrates additional details of a base station in accordance with one or more embodiments. The base station is configured, e.g., via any functional means or units, to implement the processing described above. The base station may include for instance a mapping means or unit 1401 for mapping the PRSs and a transmitting means or unit 1402 for transmitting the PRSs.

Embodiments also include a user equipment (UE) or the wireless device 36. In some embodiments the non-limiting term user equipment (UE) is used and it refers to any type of wireless device communicating with a radio network node in a cellular or mobile communication system. Examples of wireless communication devices or UEs are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc.

Figure 15:
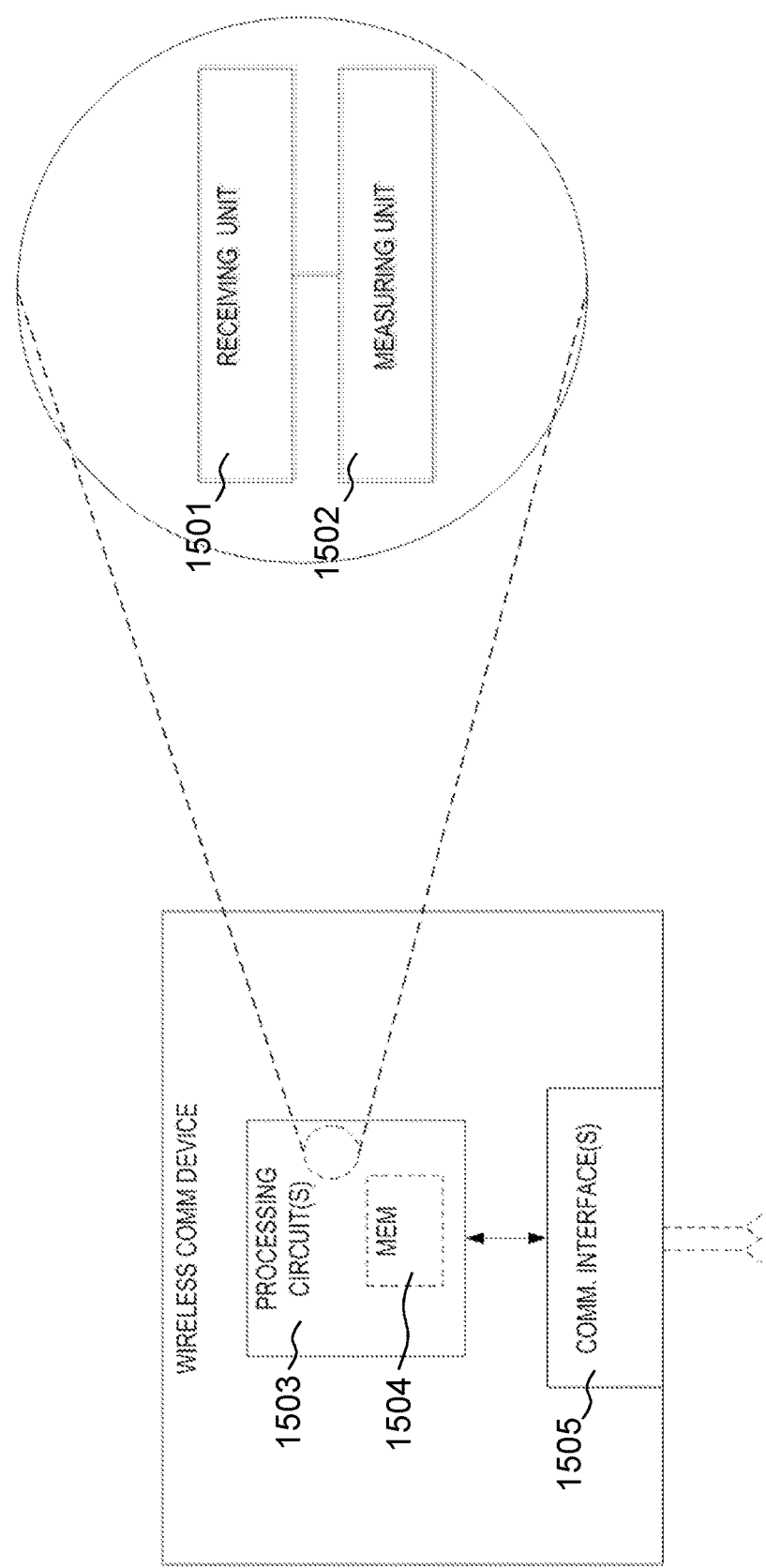
FIG. 15 is a block diagram depicting a wireless device/UE according to embodiments herein.

FIG. 15 illustrates additional details of the wireless device 36 in accordance with one or more embodiments. The wireless device 36 is configured, e.g., via any functional means or units, to implement the processing described above. The UE may include for instance a receiving means or unit 1501 for receiving the PRSs and a measuring means or unit 1502 for measuring the PRSs.

In at least some embodiments, a device/node (e.g., base station or UE) comprises one or more processing circuits/units 1403,1503 configured to implement the above processing, such as by implementing functional means or units. In one embodiment, for example, the processing circuit(s) implement functional means or units as respective circuits.

The circuits in this regard may comprise circuits dedicated to performing certain functional processing and/or one or more microprocessors in conjunction with memory. In embodiments that employ a memory 1404,1504, which may comprise one or several types of memory such as read-only memory (ROM), random-access memory, cache memory, flash memory devices, optical storage devices, etc., the memory stores program code that, when executed by the one or more processing units for carrying out one or more microprocessors, carries out the techniques described herein.

In one or more embodiments, the device also comprises one or more communication interfaces 1405,1505. The one or more communication interfaces include various components for sending and receiving data and control signals. More particularly, the communication interface(s) include a transmitter that is configured to use known signal processing techniques, typically according to one or more standards, and is configured to condition a signal for transmission, e.g., over the air via one or more antennas. Similarly, the communication interface(s) include a receiver that is configured to convert signals received, e.g., via the antenna(s), into digital samples for processing by the one or more processing circuits.

Figure 16:
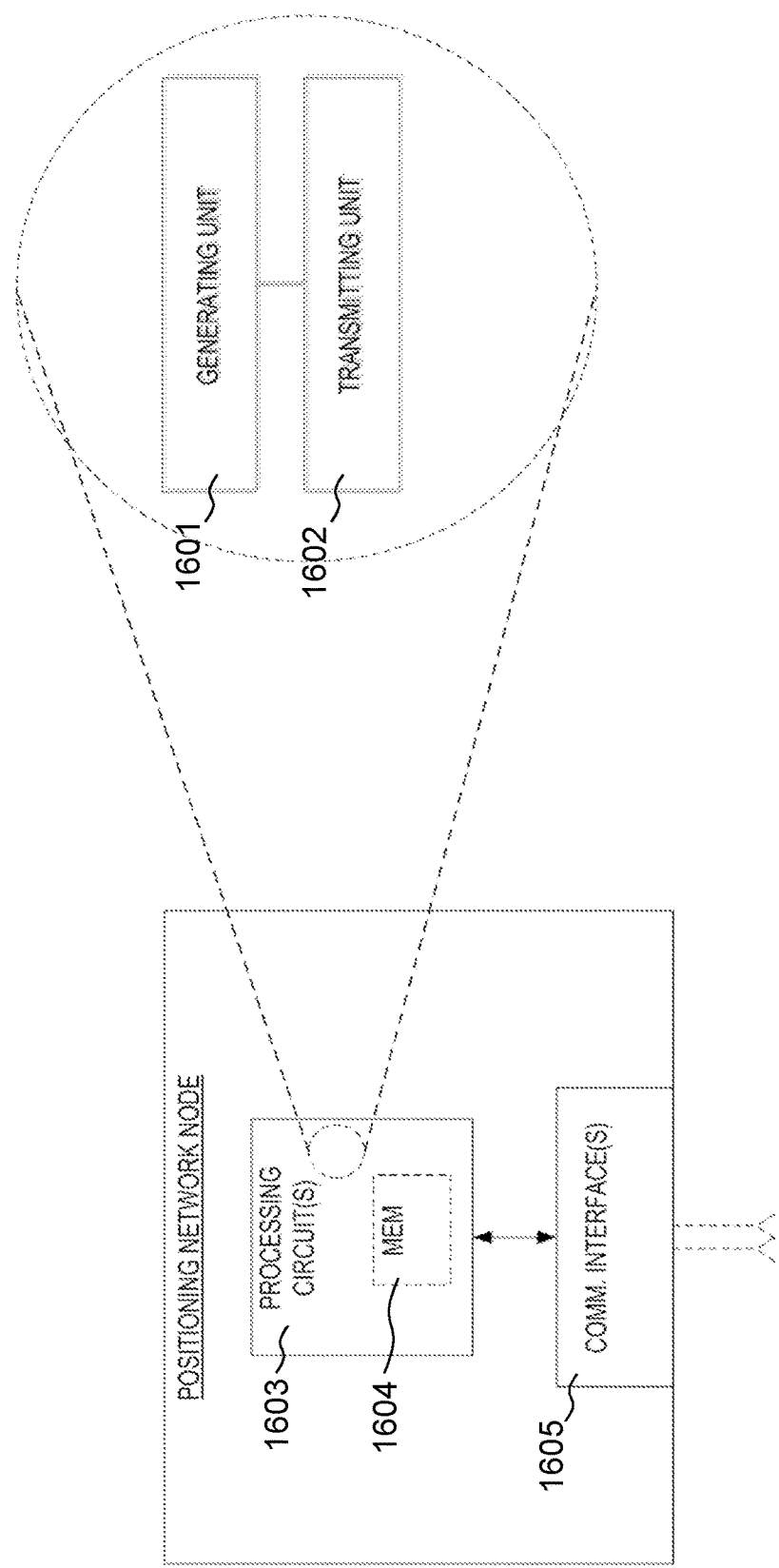
FIG. 16 is a block diagram depicting a positioning network node according to embodiments herein.

Embodiments further include for instance a positioning network node. FIG. 16 illustrates additional details of a positioning network node in accordance with one or more embodiments. The positioning network node is configured, e.g., via any functional means or units, to implement the processing described above. The positioning network node may include for instance a generating means or unit 1601 for generating configuration information and a transmitting means or unit 1602 for transmitting the configuration information.

In at least some embodiments, the node comprises one or more processing circuits/units 1603 configured to implement the above processing, such as by implementing functional means or units. In one embodiment, for example, the processing circuit(s) implement functional means or units as respective circuits. The circuits in this regard may comprise circuits dedicated to performing certain functional processing and/or one or more microprocessors in conjunction with memory. In embodiments that employ a memory 1604, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

In one or more embodiments, the positioning network node 44 also comprises one or more communication interfaces 1605. The one or more communication interfaces 1605 include various components (not shown) for sending and receiving data and control signals. More particularly, the communication interface(s) include a transmitter that is configured to use known signal processing techniques, typically according to one or more standards, and is configured to condition a signal for transmission, e.g., over the air via one or more antennas or wired network. Similarly, the communication interface(s) include a receiver that is configured to convert signals received (e.g., via the antenna(s)) into digital samples for processing by the one or more processing circuits.

Those skilled in the art will also appreciate that embodiments herein further include corresponding computer programs.

A computer program comprises instructions which, when executed on at least one processor of a node, e.g., base station, wireless communication device, or positioning network node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

The embodiments are applicable to single carrier as well as to multicarrier (MC) or carrier aggregation (CA) operation of the UE in conjunction with Multiple Input Multiple Output (MIMO) in which the UE is able to receive and/or transmit data to more than one serving cells using MIMO. The term carrier aggregation (CA) is also called, e.g. interchangeably called, "multi-carrier system", "multi-cell operation", "multi-carrier operation", "multi-carrier" transmission and/or reception.

Although embodiments herein were specifically described with respect to PRS, the embodiments are equally applicable to other types of signals used for positioning, e.g., CRS.

Figure 17:
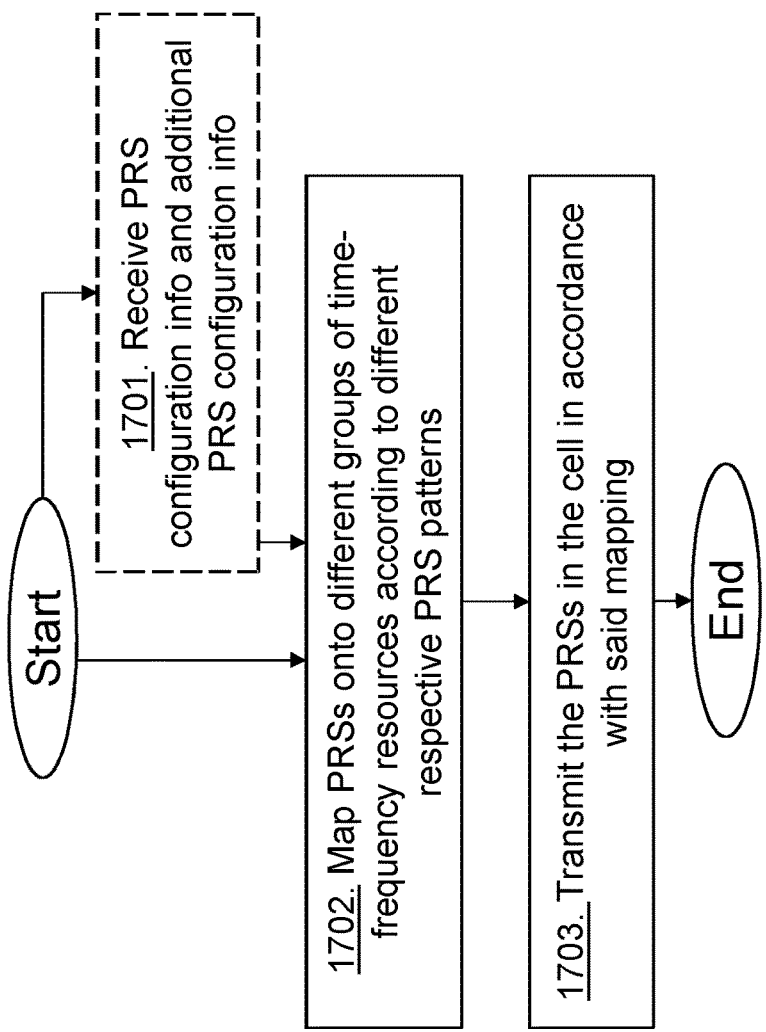
FIG. 17 is a schematic flowchart depicting a method according to embodiments herein.

The method actions performed by the base station 40-s for transmitting positioning reference signals (PRSs) in the cell 42-s served by the base station 40-s according to some embodiments will now be described with reference to a flowchart depicted in FIG. 17. The actions do not have to be taken in the order stated below, but may be taken in any suitable order. Actions performed in some embodiments are marked with dashed boxes.

Action 1701. The base station 40-s may receive, from the positioning network node 44, in addition to PRS configuration information applicable for the first one of the different groups of time-frequency resources, additional PRS configuration information applicable for the second one of the different groups of time-frequency resources. E.g. the PRS configuration information may indicate a first bandwidth to use for the first one of the different groups of time-frequency resources and the additional PRS configuration information may indicate a second bandwidth to use for the second one of the different groups of time-frequency resources and the first and second ones of the different groups of time-frequency resources may be located separated from each other within one positioning occasion. Alternatively or additionally, the PRS configuration information may indicate a first PRS subframe offset to use for the first one of the different groups of time-frequency resources and the additional PRS configuration information may indicate a second PRS subframe offset to use for the second one of the different groups of time-frequency resources. The first and second PRS subframe offsets define respective starting subframes for the transmission of the PRSs on the first and second groups of time-frequency resources respectively. The starting subframe of the first one of the different groups of time-frequency resources may in some embodiments be a cell specific subframe offset indicated relative to SFN=0. The starting subframe of the second one of the different groups of time-frequency resources may in some embodiments be indicated relative to the first PRS subframe offset. The first and second ones of the different groups of time-frequency resources may in some embodiments be located within one and the same positioning occasion whereas in other embodiments the first and second ones of the different groups of time-frequency resources may be located in separate positioning occasions. The PRS configuration information applicable for the first one of the different groups of time-frequency resources may in some embodiments also be applicable for the second one of the different groups of time-frequency resources, whereas the additional PRS configuration information is not applicable for the first one of the different groups of time-frequency resources. In some of these embodiments the additional PRS configuration information is only applicable for the second one of the different groups of time-frequency resources Action 1702. The base station 40-s maps PRSs onto different groups of time-frequency resources according to different respective positioning reference signal (PRS) patterns, wherein each of the different groups of time-frequency resources spans one or more consecutive subframes in time, meaning that each group may span one subframe or more than one subframe, where the more than one subframes are consecutive to each other. The different groups of time-frequency resources may be separated in time so as to constitute two individual positioning occasions, or may be separated in frequency so as to constitute a single individual positioning occasion. The different groups may also be separated in spatial domain by pre-coding, while occupying the same time-frequency resources. The two individual positioning occasions may be immediately adjacent in time so as to collectively form a continuous positioning occasion.

The base station 40-s may map PRSs onto the different groups of time-frequency resources in accordance with the received PRS configuration information and additional PRS configuration information, see action 1701. Thus, the base station 40-s may map PRSs onto the first and second ones of the different groups in accordance with the received PRS configuration information as applicable for the respective first and second ones of the different groups. The different groups of time-frequency resources may comprise a first group of time-frequency resources, spanning a first number of subframes within which PRSs are mapped onto time-frequency resources of each subframe according to a PRS pattern having a same frequency shift for each subframe, and a second group of time-frequency resources, spanning a second number of subframes within which PRSs are mapped onto time-frequency resources of each subframe according to respective PRS patterns having a different frequency shift relative to at least one of the respective PRS patterns of the second group of time-frequency resources and/or relative to the PRS pattern of, or applied for, the first group of time-frequency resources. Some wireless devices in the cell may be configured to measure only the PRSs mapped onto the first one of the different groups of time-frequency resources and other wireless devices in the cell may be configured to measure the PRSs mapped onto both the first one of the different groups of time-frequency resources and the second one of the different groups of time-frequency resources. Thus, the first one of the different groups is configured for a first type of wireless devices and a second type of wireless devices and the second one of the groups is configured for the second type of wireless devices.

The different respective PRS patterns of the different groups of time-frequency resources may be configured for different radio environments and/or may further be configured for different UE capabilities, for example, capability in terms of receiving bandwidth or capability to read the non-legacy PRS pattern. For example, at least one of the PRS patterns may be configured for an outdoor radio environment and at least another one of the PRS patterns may be configured for an indoor radio environment, and/or at least one of the PRS patterns may be configured for a rural radio environment and at least another one of the PRS patterns may be configured for an urban radio environment. The different respective PRS patterns of the different groups of time-frequency resources may be frequency shifted relative to one another, e.g. the frequency shift may be determined as a function of subframe number, for example, subframe number mod 6. In some embodiments PRS patterns of subframes within one group of time-frequency resources may be frequency shifted relative to one another. For example, at least one of the different groups of time-frequency resources spans at least two subframes in time and the base station may map PRSs onto time-frequency resources of each of the at least two subframes according to respective PRS patterns that are frequency shifted relative to one another. PRSs that are mapped onto at least one of the different groups of time-frequency resources may be mapped onto time-frequency resources within each of multiple consecutive subframes of the group of time-frequency resources according to different PRS patterns for at least two of those subframes. The different PRS patterns may be a function of cell identity and/or subframe number. In some embodiments a PRS subframe offset for PRSs mapped onto one of the different groups of time-frequency resources may be different than and defined relative to a PRS subframe offset for PRSs mapped onto another one of the different groups of time-frequency resources. The different groups may span respective different numbers of subframes, a same number of subframes, and/or the different groups of time-frequency resources may comprise a first group of time-frequency resources and a second group of time-frequency resources, and the number of subframes spanned by the first group may in some embodiments be no greater than 6 while the second group of time-frequency resources may span one or more subframes in addition to those spanned by the first group of time-frequency resources whereas in other embodiments the total number of subframes spanned by the first group and the second group may be no greater than 6.

Action 1703. The base station 40-s transmits the PRSs in the cell in accordance with said mapping. The different groups of time-frequency resources may be transmitted periodically, and a transmission periodicity of PRSs mapped onto one of the different groups of time-frequency resources may be the same or a multiple of the transmission periodicity of PRSs mapped onto another one of the different groups of time-frequency resources. The transmission periodicity of the PRSs mapped to the second group of time-frequency resources may thus be the same or a multiple of the transmission periodicity of PRSs mapped onto the first group of time-frequency resources.

Figure 18:
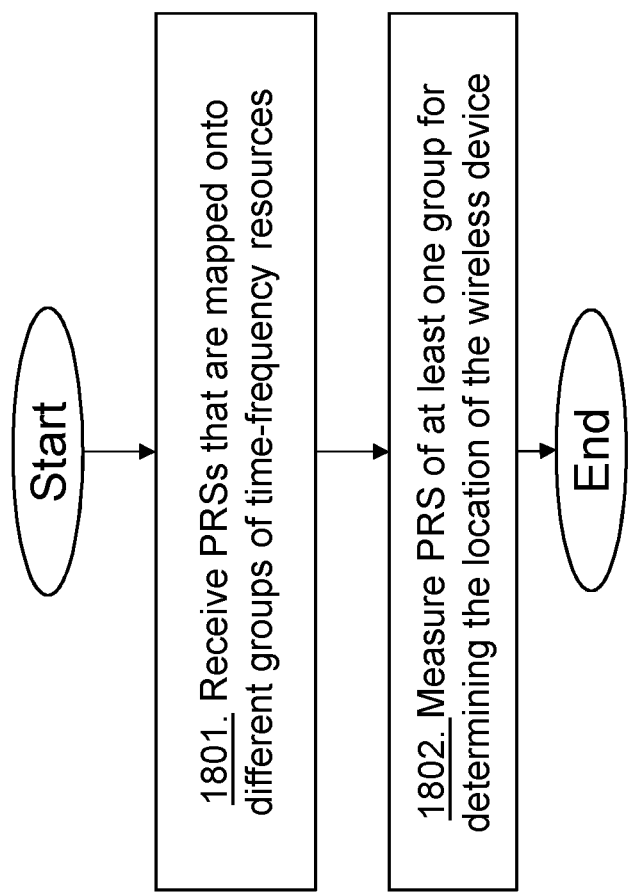
FIG. 18 is a schematic flowchart depicting a method according to embodiments herein.

The method actions performed by the wireless device 36 for receiving positioning reference signals (PRSs) at the wireless device 36 according to some embodiments will now be described with reference to a flowchart depicted in FIG. 18.

Action 1801. The wireless device 36 receives from the base station in the cell PRSs that are mapped onto different groups of time-frequency resources according to different respective positioning reference signal, PRS, patterns, wherein each of the different groups of time-frequency resources spans one subframe or more consecutive subframes in time, e.g. the group may span one subframe or more than one subframe, where the more than one subframe are consecutive to each other. The different groups of time-frequency resources may be separated in time so as to constitute two individual positioning occasions, or may be separated in frequency so as to constitute a single individual positioning occasion. The different groups may also be separated in spatial domain by pre-coding, while occupying the same time-frequency resources. The two individual positioning occasions may be immediately adjacent in time so as to collectively form a continuous positioning occasion.

The different respective PRS patterns of the different groups of time-frequency resources may be configured for different radio environments and/or may further be configured for different UE capabilities, for example, capability in terms of receiving bandwidth or capability to read the non-legacy PRS pattern. For example, at least one of the PRS patterns may be configured for an outdoor radio environment and at least another one of the PRS patterns may be configured for an indoor radio environment, and/or at least one of the PRS patterns may be configured for a rural radio environment and at least another one of the PRS patterns may be configured for an urban radio environment. The different respective PRS patterns of the different groups of time-frequency resources may be frequency shifted relative to one another, e.g. the frequency shift may be determined as a function of subframe number for example, subframe number mod 6. In some embodiments PRS patterns of subframes within one group of time-frequency resources may be frequency shifted relative to one another. For example, at least one of the different groups of time-frequency resources spans at least two subframes in time and the PRSs may be mapped onto time-frequency resources of each of the at least two subframes according to respective PRS patterns that are frequency shifted relative to one another. PRSs that are mapped onto at least one of the different groups of time-frequency resources may be mapped onto time-frequency resources within each of multiple consecutive subframes of the group of time-frequency resources according to different PRS patterns for at least two of those subframes. The different PRS patterns may be a function of cell identity and/or subframe number. In some embodiments a PRS subframe offset for PRSs mapped onto one of the different groups of time-frequency resources may be different than and defined relative to a PRS subframe offset for PRSs mapped onto another one of the different groups of time-frequency resources. The different groups may span respective different numbers of subframes, a same number of subframes, and/or the different groups of time-frequency resources may comprise a first group of time-frequency resources and a second group of time-frequency resources, and the number of subframes spanned by the first group may in some embodiments be no greater than 6 while the second group of time-frequency resources may span one or more subframes in addition to those spanned by the first group of time-frequency resources whereas in other embodiments the total number of subframes spanned by the first group and the second group may be no greater than 6.

Action 1802. The wireless device 36 measures the PRS of at least one of the groups for determining the location of the wireless device 36. The actual determining may be performed by the wireless device 36 or the base station 40-s, in which case the wireless device assists in the determining by performing the measurements and reporting them to the base station. The wireless device may measure the PRSs mapped onto both the different groups of time-frequency resources for determining the location. The different groups of time-frequency resources may be transmitted periodically, and a transmission periodicity of PRS mapped onto one of the different groups may be the same or a multiple of the transmission periodicity of PRSs mapped onto another one of the different groups. Thus, the wireless device 36 may measure the PRSs on the different groups transmitted periodically.

Figure 19:
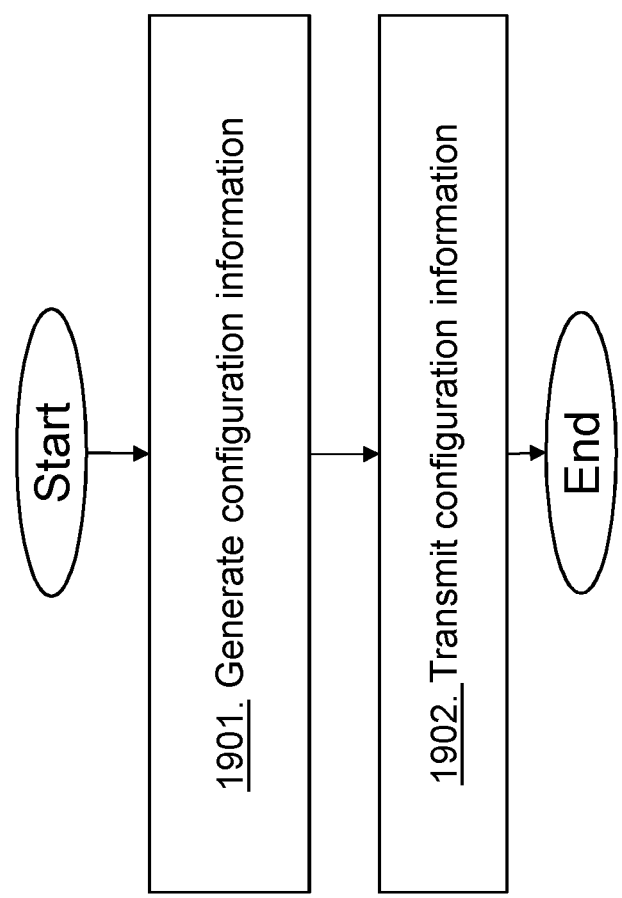
FIG. 19 is a schematic flowchart depicting a method according to embodiments herein.

The method actions performed by the positioning network node, for configuring transmission of PRSs in a cell served by a base station wireless device 36 according to some embodiments will now be described with reference to a flowchart depicted in FIG. 19. The actions do not have to be taken in the order stated below, but may be taken in any suitable order. The positioning network node 44 may be an Enhanced-Serving Mobile Location Centre, E-SMLC, in a Long Term Evolution (LTE) system.

Action 1901. The positioning network node 44 generates configuration information comprising the PRS configuration information and the additional PRS configuration information, which configures mapping of PRSs onto different groups of time-frequency resources according to different respective PRS patterns, wherein each of the different groups spans one or more consecutive subframes in time, e.g. the group may span one subframe or more than one subframe, where the more than one subframes are consecutive to each other. The PRS configuration information and the additional PRS configuration information are applicable for a first one of the different groups of time-frequency resources and a second one of the different groups of time-frequency resources respectively. The different groups of time-frequency resources may be separated in time so as to constitute two individual positioning occasions, or may be separated in frequency so as to constitute a single individual positioning occasion. The different groups may also be separated in spatial domain by pre-coding, while occupying the same time-frequency resources. The two individual positioning occasions may be immediately adjacent in time so as to collectively form a continuous positioning occasion. The different respective PRS patterns of the different groups of time-frequency resources may be configured for different radio environments and/or may further be configured for different UE capabilities, for example, capability in terms of receiving bandwidth or capability to read the non-legacy PRS pattern. For example, at least one of the PRS patterns may be configured for an outdoor radio environment and at least another one of the PRS patterns may be configured for an indoor radio environment, and/or at least one of the PRS patterns may be configured for a rural radio environment and at least another one of the PRS patterns may be configured for an urban radio environment. The different respective PRS patterns of the different groups of time-frequency resources may be frequency shifted relative to one another, e.g. the frequency shift may be determined as a function of subframe number, for example, subframe number mod 6. In some embodiments PRS patterns of subframes within one group of time-frequency resources may be frequency shifted relative to one another. For example, at least one of the different groups of time-frequency resources spans at least two subframes in time and the base station may map PRSs onto time-frequency resources of each of the at least two subframes according to respective PRS patterns that are frequency shifted relative to one another. PRSs that are mapped onto at least one of the different groups of time-frequency resources may be mapped onto time-frequency resources within each of multiple consecutive subframes of the group of time-frequency resources according to different PRS patterns for at least two of those subframes. The different PRS patterns may be a function of cell identity and/or subframe number. In some embodiments a PRS subframe offset for PRSs mapped onto one of the different groups of time-frequency resources may be different than and defined relative to a PRS subframe offset for PRSs mapped onto another one of the different groups of time-frequency resources. The different groups may span respective different numbers of subframes, a same number of subframes, and/or the different groups of time-frequency resources may comprise a first group of time-frequency resources and a second group of time-frequency resources, and the number of subframes spanned by the first group may in some embodiments be no greater than 6 while the second group of time-frequency resources may span one or more subframes in addition to those spanned by the first group of time-frequency resources whereas in other embodiments the total number of subframes spanned by the first group and the second group may be no greater than 6.

The positioning network node 44 may generate the configuration information to include different PRS configuration indexes for different configuration tables that govern the configuration of PRSs mapped onto the different groups. Each of the configuration tables may define different possible PRS positioning occasion periodicities and/or different possible PRS subframe offsets indexed by different possible PRS configuration indexes. In order to interpret PRS configuration indexes, the base station 40-*s* may comprise or have stored thereon similar tables defining different possible PRS positioning occasion periodicities and/or different possible PRS subframe offsets indexed by different possible PRS configuration indexes.

Action 1902. The positioning network node 44 transmits the configuration information to the base station (40) for mapping of the PRS in accordance with the PRS configuration information and the additional PRS configuration information.

Figure 20:
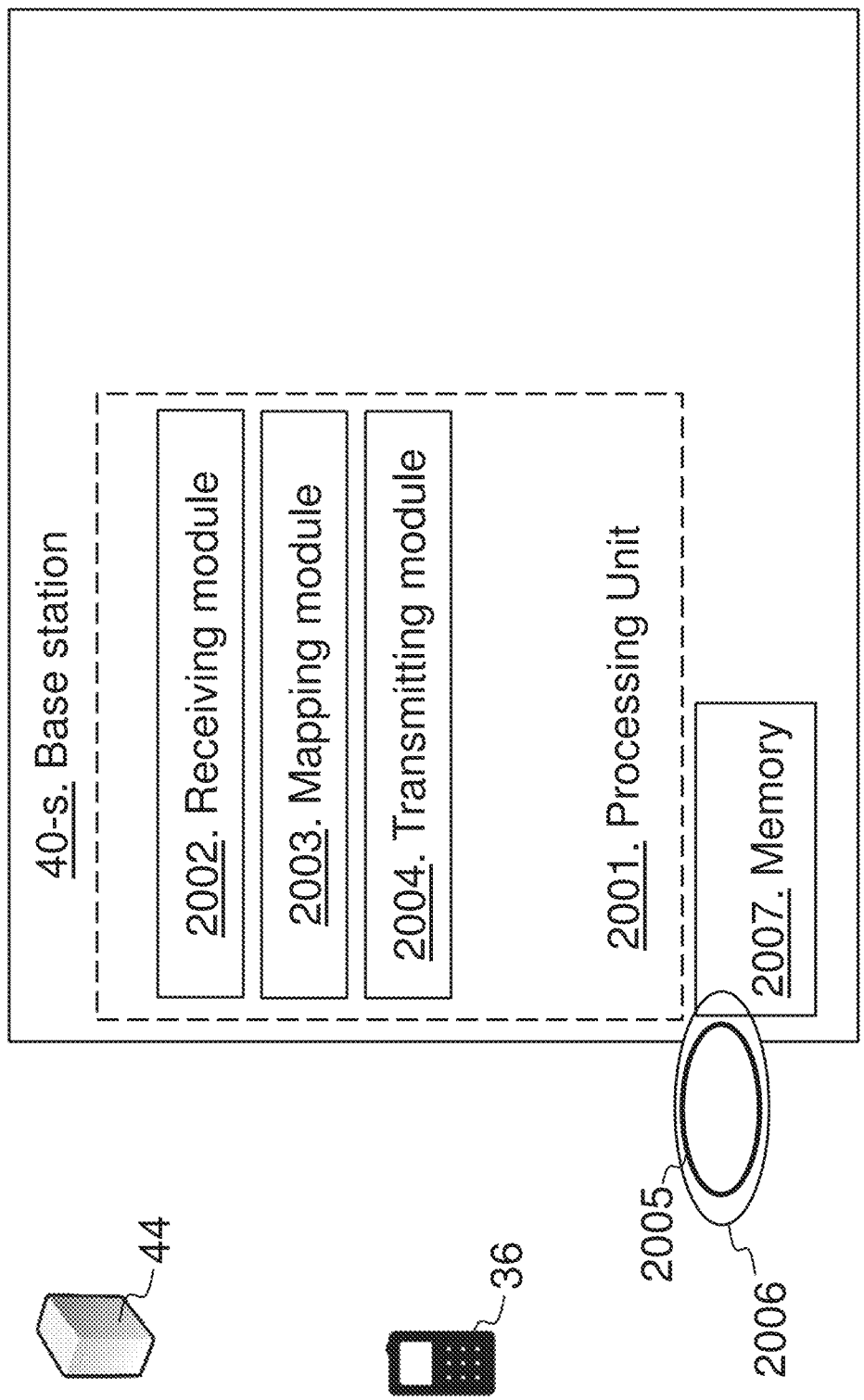
FIG. 20 is a block diagram depicting a base station according to embodiments herein.

In order to perform the method herein a base station is herein provided. FIG. 20 depicts the base station 40-*s* serving the cell. The base station may comprise a processing unit 2001 e.g. one or more processors, configured to perform the methods herein.

The base station 40-*s* may comprise a receiving module 2002. The base station 40-*s*, the processing unit 2001, and/or the receiving module 2002 may be configured to receive, from the positioning network node 44, in addition to PRS configuration information applicable for the first one of the different groups of time-frequency resources, additional PRS configuration information applicable for the second one of the different groups of time-frequency resources. E.g. the PRS configuration information may indicate a first bandwidth to use for the first one of the different groups of time-frequency resources and the additional PRS configuration information may indicate a second bandwidth to use for the second one of the different groups of time-frequency resources and wherein the first and second ones of the different groups of time-frequency resources are located separated from each other within one positioning occasion. The PRS configuration information may indicate a first PRS subframe offset to use for the first one of the different groups of time-frequency resources and the additional PRS configuration information may indicate a second PRS subframe offset to use for the second one of the different groups of time-frequency resources, wherein the first and second PRS subframe offsets define respective starting subframes for the transmission of the PRSs on the first and second groups of time-frequency resources respectively.

The base station 40-*s* may comprise a mapping module 2003. The base station 40-*s*, the processing unit 2001, and/or the mapping module 2003 is configured to map PRSs onto different groups of time-frequency resources according to different respective PRS patterns, wherein each of the different groups spans one subframe or more consecutive subframes in time e.g. the group may span one subframe or more than one subframe, where the more than one subframes are consecutive to each other. The different groups of time-frequency resources may be separated in time so as to constitute two individual positioning occasions, or may be separated in frequency so as to constitute a single individual positioning occasion, or are separated in a spatial domain by pre-coding, while occupying the same time-frequency resources. The different groups may also be separated in spatial domain by pre-coding, while occupying the same time-frequency resources. The two individual positioning occasions may be immediately adjacent in time so as to collectively form a continuous positioning occasion.

The base station 40-s, the processing unit 2001 and/or the mapping module 2003 may be configured to map PRSs onto the different groups of time-frequency resources in accordance with the received PRS configuration information and additional PRS configuration information. Thus, the base station 40-s, the processing unit 2001 and/or the mapping module 2003 may be configured to map PRSs onto the first and second ones of the different groups in accordance with the received PRS configuration information as applicable for the respective first and second ones of the different groups. The different groups of time-frequency resources may comprise a first group of time-frequency resources, spanning a first number of subframes within which PRSs are mapped onto time-frequency resources of each subframe according to a PRS pattern having a same frequency shift for each subframe, and a second group of time-frequency resources, spanning a second number of subframes within which PRSs are mapped onto time-frequency resources of each subframe according to respective PRS patterns having a different frequency shift relative to at least one of the respective PRS patterns and/or relative to the PRS pattern of or applied for the first group of time-frequency resources. Some wireless devices in the cell may be configured to measure only the PRSs mapped onto the first one of the different groups of time-frequency resources and other wireless devices in the cell may be configured to measure the PRSs mapped onto both the first one of the different groups of time-frequency resources and a second one of the different groups of time-frequency resources. Thus, the first one of the different groups is configured for a first type of wireless devices and a second type of wireless devices and the second one of the group is configured for the second type of wireless devices.

The different respective PRS patterns of the different groups of time-frequency resources may be configured for different radio environments and/or may further be configured for different UE capabilities, for example, receiving bandwidth or capability to read the non-legacy PRS pattern. For example, at least one of the PRS patterns may be configured for an outdoor radio environment and at least another one of the PRS patterns may be configured for an indoor radio environment, and/or at least one of the PRS patterns may be configured for a rural radio environment and at least another one of the PRS patterns may be configured for an urban radio environment. The different respective PRS patterns of the different groups of time-frequency resources may be frequency shifted relative to one another, e.g. the frequency shift may be determined as a function of subframe for example, subframe number mod 6. In some embodiments PRS patterns of subframes within one group of time-frequency resources may be frequency shifted relative to one another. For example, at least one of the different groups of time-frequency resources spans at least two subframes in time and wherein the base station may map PRSs onto time-frequency resources of each of the at least two subframes according to respective PRS patterns that are frequency shifted relative to one another. PRSs that are mapped onto at least one of the different groups of time-frequency resources may be mapped onto time-frequency resources within each of multiple consecutive subframes of the group of time-frequency resources according to different PRS patterns for at least two of those subframes. The different PRS patterns may be a function of cell identity and/or subframe number. In some embodiments a PRS subframe offset for PRSs mapped onto one of the different groups of time-frequency resources may be different than and defined relative to a PRS subframe offset for PRSs mapped onto another one of the different groups of time-frequency resources. The different groups may span respective different numbers of subframes, a same number of subframes, and/or the different groups of time-frequency resources comprise a first group of time-frequency resources and a second group of time-frequency resources, and wherein the number of subframes spanned by the first group is no greater than 6 or the total of the subframes spanned by the first group and the second group is no greater than 6.

The base station 40-s may comprise a transmitting module 2004. The base station 40-s, the processing unit 2001, and/or the transmitting module 2004 is configured to transmit the PRSs in the cell in accordance with said mapping. The base station 40-s, the processing unit 2001, and/or the transmitting module 2004 may be configured to transmit the different groups of time-frequency resources periodically, and a transmission periodicity of PRSs mapped onto one of the different groups of time-frequency resources may be the same or a multiple of the transmission periodicity of PRSs mapped onto another one of the different groups of time-frequency resources. The transmission periodicity of the PRSs mapped to the second group of time-frequency resources may thus be the same or a multiple of the transmission periodicity of PRSs mapped onto the first group of time-frequency resources.

The methods according to the embodiments described herein for the base station 40-s are respectively implemented by means of e.g. a computer program 2005 or a computer program product, comprising instructions, i.e., software code portions, which, when executed on at least one processor, cause the at least one processor to carry out the actions described herein, as performed by the base station 40-s. The computer program 2005 may be stored on a computer-readable storage medium 2006, e.g. a disc or similar. The computer-readable storage medium 2006, having stored thereon the computer program, may comprise the instructions which, when executed on at least one processor, cause the at least one processor to carry out the actions described herein, as performed by the base station 40-s. In some embodiments, the computer-readable storage medium may be a non-transitory computer-readable storage medium.

The base station 40-s further comprises a memory 2007. The memory comprises one or more units to be used to store data on, such as PRS patterns, groups, resources, scheduling information, mapping info, applications to perform the methods disclosed herein when being executed, and similar.

Figure 21:
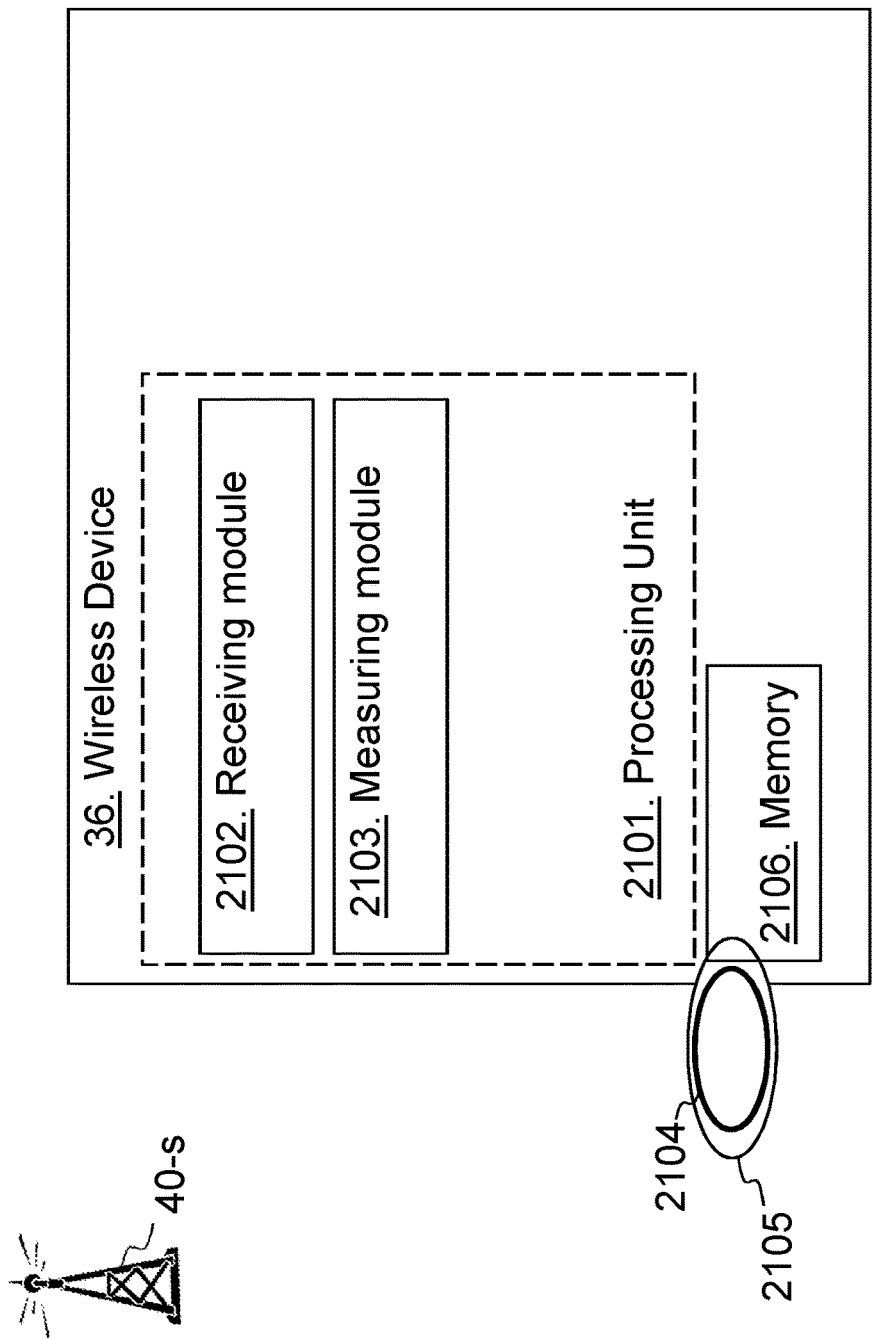
FIG. 21 is a block diagram depicting a wireless device according to embodiments herein.

In order to perform the method herein a wireless device is herein provided. FIG. 21 depicts the wireless device 36 configure to operate in the cell served by the base station 40-s. The wireless device 36 may comprise a processing unit 2101 e.g. one or more processors configured to perform the methods herein.

The wireless device 36 may comprise a receiving module 2102. The wireless device 36, the processing unit 2101, and/or the receiving module 2102 is configured to receive the PRSs from the base station at the wireless device 36 in the cell, wherein individual ones of the PRSs are mapped onto different groups of time-frequency resources according to different respective PRS patterns, wherein each of the different groups spans one or more consecutive subframes in time, e.g. the group may span one subframe or more than one subframe, where the more than one subframe are consecutive to each other. The different groups of time-frequency resources may be separated in time so as to constitute two individual positioning occasions, or may be separated in frequency so as to constitute a single individual positioning occasion, or are separated in a spatial domain by pre-coding, while occupying the same time-frequency resources. The different groups may also be separated in spatial domain by pre-coding, while occupying the same time-frequency resources. The two individual positioning occasions may be immediately adjacent in time so as to collectively form a continuous positioning occasion.

The different respective PRS patterns of the different groups of time-frequency resources may be configured for different radio environments and/or may further be configured for different UE capabilities, for example, receiving bandwidth or capability to read the non-legacy PRS pattern. For example, at least one of the PRS patterns may be configured for an outdoor radio environment and at least another one of the PRS patterns may be configured for an indoor radio environment, and/or at least one of the PRS patterns may be configured for a rural radio environment and at least another one of the PRS patterns may be configured for an urban radio environment. The different respective PRS patterns of the different groups of time-frequency resources may be frequency shifted relative to one another, e.g. the frequency shift may be determined as a function of subframe for example, subframe number mod 6. In some embodiments PRS patterns of subframes within one group of time-frequency resources may be frequency shifted relative to one another. For example, at least one of the different groups of time-frequency resources spans at least two subframes in time and wherein the base station may map PRSs onto time-frequency resources of each of the at least two subframes according to respective PRS patterns that are frequency shifted relative to one another. PRSs that are mapped onto at least one of the different groups of time-frequency resources may be mapped onto time-frequency resources within each of multiple consecutive subframes of the group of time-frequency resources according to different PRS patterns for at least two of those subframes. The different PRS patterns may be a function of cell identity and/or subframe number. In some embodiments a PRS subframe offset for PRSs mapped onto one of the different groups of time-frequency resources may be different than and defined relative to a PRS subframe offset for PRSs mapped onto another one of the different groups of time-frequency resources. The different groups may span respective different numbers of subframes, a same number of subframes, and/or the different groups of time-frequency resources comprise a first group of time-frequency resources and a second group of time-frequency resources, and wherein the number of subframes spanned by the first group is no greater than 6 or the total of the subframes spanned by the first group and the second group is no greater than 6.

The wireless device 36 may comprise a measuring module 2103. The wireless device 36, the processing unit 2101, and/or the measuring module 2103 is configured to measure the PRS of at least one of the groups in order to enable determination of the location of the wireless device 36. The wireless device 36 or the base station 40-s may be configured to determine the actual position i e location of the wireless device 36. The wireless device 36, the processing unit 2101, and/or the measuring module 2103 may be configured to measure the PRSs mapped onto both the different groups of time-frequency resources for determining the location. The different groups of time-frequency resources may be transmitted periodically, and a transmission periodicity of PRS mapped onto one of the different groups is the same or a multiple of the transmission periodicity of PRSs mapped onto another one of the different groups. Thus, the wireless device 36, the processing unit 2101, and/or the measuring module 2103 may be configured to measure the PRSs on the different groups transmitted periodically to determine or assist in determine the location of the wireless device 36.

The methods according to the embodiments described herein for the wireless device 36 are respectively implemented by means of e.g. a computer program 2104 or a computer program product, comprising instructions, i.e., software code portions, which, when executed on at least one processor, cause the at least one processor to carry out the actions described herein, as performed by the wireless device 36. The computer program 2104 may be stored on a computer-readable storage medium 2105, e.g. a disc or similar. The computer-readable storage medium 2105, having stored thereon the computer program, may comprise the instructions which, when executed on at least one processor, cause the at least one processor to carry out the actions described herein, as performed by the wireless device 36. In some embodiments, the computer-readable storage medium may be a non-transitory computer-readable storage medium.

The wireless device 36 further comprises a memory 2106. The memory comprises one or more units to be used to store data on, such as PRS patterns, groups, resources, scheduling information, mapping info, applications to perform the methods disclosed herein when being executed, and similar.

Figure 22:
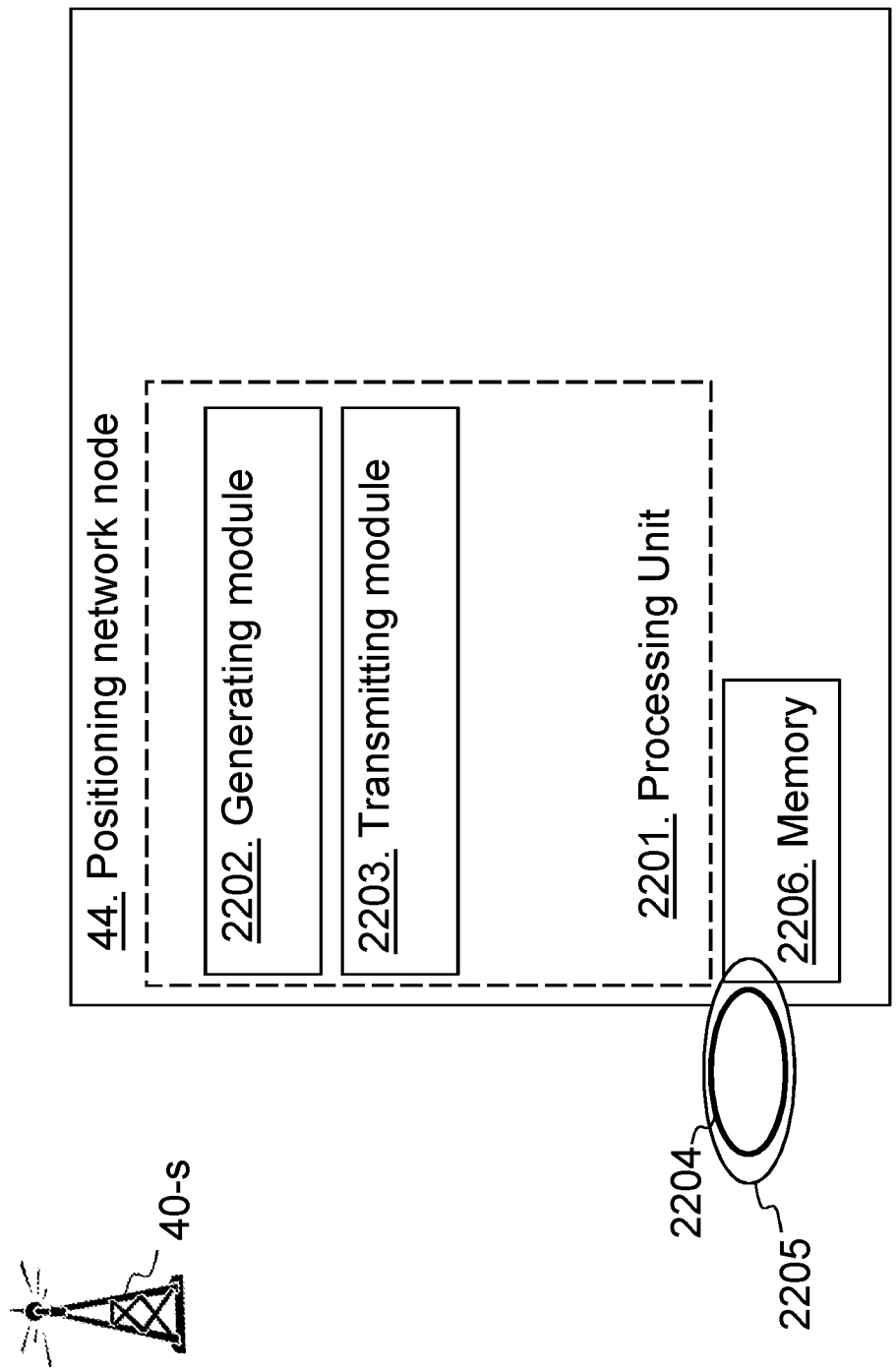
FIG. 22 is a block diagram depicting a positioning network node according to embodiments herein.

In order to perform the method herein a positioning network node is herein provided. FIG. 22 depicts the positioning network node 44 for configuring Positioning Reference Signals, PRSs, transmission in the cell served by the base station. The positioning network node 44 may comprise a processing unit 2201 e.g. one or more processors, configured to perform the methods herein. The positioning network node 44 may be an Enhanced-Serving Mobile Location Centre, E-SMLC, in an LTE system.

The positioning network node 44, the processing unit 2201, and/or the generating module 2202 is configured to generate the configuration information comprising the PRS configuration information and the additional PRS configuration information, which configures mapping of PRSs onto different groups of time-frequency resources according to different respective PRS patterns, wherein each of the different groups spans one or more consecutive subframes in time, e.g. the group may span one subframe or more than one subframe, where the more than one subframes are consecutive to each other. The PRS configuration information and the additional PRS configuration information are applicable for a first one of the different groups of time-frequency resources and a second one of the different groups of time-frequency resources respectively. The different groups of time-frequency resources may be separated in time so as to constitute two individual positioning occasions, or may be separated in frequency so as to constitute a single individual positioning occasion. The different groups may also be separated in spatial domain by pre-coding, while occupying the same time-frequency resources. The two individual positioning occasions may be immediately adjacent in time so as to collectively form a continuous positioning occasion. The different respective PRS patterns of the different groups of time-frequency resources may be configured for different radio environments and/or may further be configured for different UE capabilities, for example, capability in terms of receiving bandwidth or capability to read the non-legacy PRS pattern. For example, at least one of the PRS patterns may be configured for an outdoor radio environment and at least another one of the PRS patterns may be configured for an indoor radio environment, and/or at least one of the PRS patterns may be configured for a rural radio environment and at least another one of the PRS patterns may be configured for an urban radio environment. The different respective PRS patterns of the different groups of time-frequency resources may be frequency shifted relative to one another, e.g. the frequency shift may be determined as a function of subframe number, for example, subframe number mod 6. In some embodiments PRS patterns of subframes within one group of time-frequency resources may be frequency shifted relative to one another. For example, at least one of the different groups of time-frequency resources spans at least two subframes in time and wherein the base station may map PRSs onto time-frequency resources of each of the at least two subframes according to respective PRS patterns that are frequency shifted relative to one another. PRSs that are mapped onto at least one of the different groups of time-frequency resources may be mapped onto time-frequency resources within each of multiple consecutive subframes of the group of time-frequency resources according to different PRS patterns for at least two of those subframes. The different PRS patterns may be a function of cell identity and/or subframe number. In some embodiments a PRS subframe offset for PRSs mapped onto one of the different groups of time-frequency resources may be different than and defined relative to a PRS subframe offset for PRSs mapped onto another one of the different groups of time-frequency resources. The different groups may span respective different numbers of subframes, a same number of subframes, and/or the different groups of time-frequency resources may comprise a first group of time-frequency resources and a second group of time-frequency resources, and the number of subframes spanned by the first group may in some embodiments be no greater than 6 while the second group of time-frequency resources may span one or more subframes in addition to those spanned by the first group of time-frequency resources whereas in other embodiments the total number of subframes spanned by the first group and the second group may be no greater than 6.

The positioning network node 44, the processing unit 2201 and/or the generating module 2202 may be configured to generate the configuration information to include different PRS configuration indexes for different configuration tables that govern the configuration of PRSs mapped onto the different groups. Each of the configuration tables may define different possible PRS positioning occasion periodicities and/or different possible PRS subframe offsets indexed by different possible PRS configuration indexes. In order to interpret PRS configuration indexes, the base station 40-*s* may comprise or have stored thereon similar tables defining different possible PRS positioning occasion periodicities and/or different possible PRS subframe offsets indexed by different possible PRS configuration indexes.

The positioning network node may comprise a transmitting module 2203. The positioning network node 44, the processing unit 2201, and/or the transmitting module 2203 is configured to transmit the configuration information to the base station for mapping of the PRSs in accordance with the PRS configuration information and the additional PRS configuration information.

The methods according to the embodiments described herein for the positioning network node 44 are respectively implemented by means of e.g. a computer program 2204 or a computer program product, comprising instructions, i.e., software code portions, which, when executed on at least one processor, cause the at least one processor to carry out the actions described herein, as performed by the positioning network node 44. The computer program 2204 may be stored on a computer-readable storage medium 2205, e.g. a disc or similar. The computer-readable storage medium 2205, having stored thereon the computer program, may comprise the instructions which, when executed on at least one processor, cause the at least one processor to carry out the actions described herein, as performed by positioning network node 44. In some embodiments, the computer-readable storage medium may be a non-transitory computer-readable storage medium.

The positioning network node 44 further comprises a memory 2206. The memory comprises one or more units to be used to store data on, such as PRS patterns, groups, resources, scheduling information, mapping info, applications to perform the methods disclosed herein when being executed, and similar.

In other words a method for transmitting PRSs in the cell served by the base station is herein provided. The method comprises mapping PRSs onto time-frequency resources within each of multiple consecutive subframes of a positioning occasion according to different PRS patterns for at least two of those subframes, wherein the different PRS patterns are frequency shifted relative to one another. The method further comprises transmitting the PRSs in the cell in accordance with said mapping. The different PRS patterns may be shifted in frequency by one subcarrier from subframe to subframe, and the different PRS patterns may be associated with different subframe numbers.

Furthermore, a method for receiving PRSs in the cell served by the base station is herein provided. The method comprising receiving PRSs from the base station at a UE in the cell, wherein individual ones of the PRSs are mapped onto time-frequency resources within each of multiple consecutive subframes of a positioning occasion according to different PRS patterns for at least two of those subframes, wherein the different PRS patterns are frequency shifted relative to one another.

The method further comprising measuring the PRSs for determining the location of the wireless device 36. The different PRS patterns may be shifted in frequency by one subcarrier from subframe to subframe, the different PRS patterns may be associated with different subframe numbers.

The method may further comprise receiving signaling indicating the frequency shift associated with different PRS patterns.

A base station for serving a cell is herein provided, the base station is configured to map PRSs onto time-frequency resources within each of multiple consecutive subframes of a positioning occasion according to different PRS patterns for at least two of those subframes, wherein the different PRS patterns are frequency shifted relative to one another. The base station is further configured to transmit the PRSs in the cell in accordance with said mapping.

A wireless device configured to operate in a cell served by a base station is herein provided, the wireless device 36 is configured to: receive PRSs from the base station, wherein individual ones of the PRSs are mapped onto time-frequency resources within each of multiple consecutive subframes of a positioning occasion according to different PRS patterns for at least two of those subframes, wherein the different PRS patterns are frequency shifted relative to one another; and to measure the PRSs in order to enable, e.g. by assisting the base station or by performing by the wireless device, determination of the location of the wireless device 36.

A computer program is herein provided comprising instructions which, when executed by at least one processor of a node, causes the node to carry out any of the methods herein. A carrier containing the computer program is also herein provided, wherein the carrier is one of an electronic signal, optical signal, radio signal, or computer readable storage medium.

Those skilled in the art will recognize that embodiments may be carried out in other ways than those specifically set forth herein without departing from essential characteristics of the claimed solution. The present embodiments are thus to be considered in all respects as illustrative and not restrictive, and all changes coming within the meaning and equivalency range of the appended claims are intended to be embraced therein.

The invention claimed is:

1. A method, performed by a base station, for transmitting positioning reference signals (PRSs) in a cell served by the base station, the method comprising:
   mapping PRSs onto different groups of time-frequency resources according to different respective PRS patterns, wherein each of the different groups of time-frequency resources spans one or more consecutive subframes in time, wherein the different groups of time-frequency resources comprise a first group of time-frequency resources and a second group of time-frequency resources, wherein the different groups of time-frequency resources are separated in time so as to constitute two individual positioning occasions, and wherein the mapping of PRSs onto the different groups of time-frequency resources is performed in accordance with PRS configuration information and additional PRS configuration information received from a positioning network node; and
   transmitting the PRSs in the cell in accordance with the mapping, wherein the entire PRS pattern of the first group of time-frequency resources is frequency shifted relative to the PRS pattern of the second group of time-frequency resources.

2. The method of claim 1 further comprising receiving, from a positioning network node, the PRS configuration information applicable for the first group of time-frequency resources, and additional PRS configuration information applicable for the second group of time-frequency resources.

3. The method of claim 2:
   wherein the PRS configuration information indicates a first PRS subframe offset to use for the first group of time-frequency resources;
   wherein the additional PRS configuration information indicates a second PRS subframe offset to use for the second group of time-frequency resources;
   wherein the first and second PRS subframe offsets define respective starting subframes for the transmission of the PRSs on the first and second groups of time-frequency resources respectively.

4. The method of claim 1, wherein the different respective PRS patterns of the different groups of time-frequency resources are configured for different radio environments.

5. The method of claim 1, wherein PRS patterns of subframes within one group of time-frequency resources are frequency shifted relative to one another.

6. The method of claim 1, wherein the first and second groups of time-frequency resources are transmitted periodically, and a transmission periodicity of PRSs mapped onto the first group of time-frequency resources is the same or a multiple of the transmission periodicity of PRSs mapped onto the second group of time-frequency resources.

7. The method of claim 1, wherein a PRS subframe offset for PRSs mapped onto the first group of time-frequency resources is different than and defined relative to a PRS subframe offset for PRSs mapped onto the second group of time-frequency resources.

8. The method of claim 1, wherein PRSs mapped onto at least one of the first and second groups of time-frequency resources are mapped onto time-frequency resources within each of multiple consecutive subframes of the group of time-frequency resources according to different PRS patterns for at least two of those subframes.

9. The method of claim 1:
   wherein a number of subframes spanned by the first group is no greater than 6, or a total number of subframes spanned by the first group and the second group is no greater than 6.

10. A method, performed by a wireless device, for receiving positioning reference signals (PRSs) in a cell served by a base station, the method comprising:
    receiving, from the base station and at the wireless device in the cell, PRSs that are mapped onto different groups of time-frequency resources according to different respective PRS patterns, wherein each of the different groups of time-frequency resources spans one or more consecutive subframes in time, wherein the different groups of time-frequency resources comprise a first group of time-frequency resources and a second group of time-frequency resources, wherein the different groups of time-frequency resources are separated in time so as to constitute two individual positioning occasions, and wherein the entire PRS pattern of the first group of time-frequency resources is frequency shifted relative to the PRS pattern of the second group of time-frequency resources, and wherein the PRSs are mapped onto the different groups of time-frequency resources in accordance with PRS configuration information and additional PRS configuration information received by the base station from a positioning network node; and
    measuring the PRS of at least one group for determining a location of the wireless device.

11. The method of claim 10, wherein different respective PRS patterns of the different groups of time-frequency resources are configured for different radio environments.

12. The method of claim 10, wherein PRS patterns of subframes within one group of time-frequency resources are frequency shifted relative to one another.

13. The method of claim 10, wherein the measuring comprises measuring the PRSs mapped onto both the first and second groups of time-frequency resources.

14. The method of claim 10, wherein an offset of PRS subframes for PRS mapped onto the first group of time-frequency resources is different than and defined relative to an offset of PRS subframes for PRS mapped onto the second group of time-frequency resources.

15. The method of claim 10, wherein PRSs mapped onto at least one of the first and second groups of time-frequency resources are mapped onto time-frequency resources within each of multiple consecutive subframes of the at least one of the first and second groups of time-frequency resources according to different PRS patterns for at least two of those multiple consecutive subframes.

16. The method of claim 10:
wherein a number of subframes spanned by the first group is no greater than 6, or a total number of subframes spanned by the first group and the second group is no greater than 6.

17. A base station serving a cell, the base station comprising:
processing circuitry;
memory containing instructions executable by the processing circuitry whereby the base station is operative to:
map Positioning Reference Signals (PRSs) onto different groups of time-frequency resources according to different respective PRS patterns, wherein each of the different groups spans one or more consecutive subframes in time, wherein the different groups of time-frequency resources comprise a first group of time-frequency resources and a second group of time-frequency resources, wherein the different groups of time-frequency resources are separated in time so as to constitute two individual positioning occasions, and wherein mapping of the PRSs onto the different groups of time-frequency resources is performed in accordance with PRS configuration information and additional PRS configuration information received from a positioning network node; and
transmit the PRSs in the cell in accordance with the mapping, wherein the entire PRS pattern of the first group of time-frequency resources is frequency shifted relative to the PRS pattern of the second group of time-frequency resources.

18. A wireless device configured to operate in a cell served by a base station, the wireless device comprising:
processing circuitry;
memory containing instructions executable by the processing circuitry whereby the wireless device is operative to:
receive Positioning Reference Signals (PRSs) from the base station at the wireless device in the cell, wherein individual ones of the PRSs are mapped onto different groups of time-frequency resources according to different respective PRS patterns, wherein each of the different groups spans one or more consecutive subframes in time, wherein the different groups of time-frequency resources comprise a first group of time-frequency resources and a second group of time-frequency resources, wherein the different groups of time-frequency resources are separated in time so as to constitute two individual positioning occasions, wherein the entire PRS pattern of the first group of time-frequency resources is frequency shifted relative to the PRS pattern of the second group of time-frequency resources, and wherein the PRSs are mapped onto the different groups of time-frequency resources in accordance with PRS configuration information and additional PRS configuration information received by the base station from a positioning network node; and
measure the PRSs of at least one of the groups in order to enable determination of a location of the wireless device.

* * * * *